US010944518B2

(12) United States Patent
Lan et al.

(10) Patent No.: US 10,944,518 B2
(45) Date of Patent: Mar. 9, 2021

(54) RESOURCE UNIT (RU) ALLOCATION FOR DOWNLINK (DL) MULTI-BLOCK ACKNOWLEDGEMENT (M-BA) FOR UPLINK (UL) MULTIPLE USER (MU) WIRELESS COMMUNICATIONS

(71) Applicant: Avago Technologies International Sales Pte. Limited, Singapore (SG)

(72) Inventors: Zhou Lan, San Jose, CA (US); Matthew James Fischer, Mountain View, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 300 days.

(21) Appl. No.: 15/474,284

(22) Filed: Mar. 30, 2017

(65) Prior Publication Data

US 2017/0317796 A1    Nov. 2, 2017

Related U.S. Application Data

(60) Provisional application No. 62/328,914, filed on Apr. 28, 2016, provisional application No. 62/476,075, filed on Mar. 24, 2017.

(51) Int. Cl.
*H04L 5/00*          (2006.01)
*H04W 72/04*         (2009.01)
*H04W 88/08*         (2009.01)

(52) U.S. Cl.
CPC .......... *H04L 5/0007* (2013.01); *H04L 5/0055* (2013.01); *H04W 72/044* (2013.01); *H04W 88/08* (2013.01)

(58) Field of Classification Search
CPC .. H04L 5/0007; H04L 5/0055; H04W 72/044; H04W 88/08
See application file for complete search history.

(56) References Cited

U.S. PATENT DOCUMENTS

2010/0220678 A1    9/2010  Wentink
2010/0329195 A1   12/2010  Abraham et al.
(Continued)

OTHER PUBLICATIONS

U.S. Appl. No. 62/324,900, filed Apr. 20, 2016; related to cited Kim et al. US 2017/0311289 A1 (Year: 2016).*
(Continued)

*Primary Examiner* — Kodzovi Acolatse
*Assistant Examiner* — Farhad Ali
(74) *Attorney, Agent, or Firm* — Foley & Lardner LLP

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. The WDEV generate a first orthogonal frequency division multiple access (OFDMA) frame that specifies information regarding resource unit (RUs) to be used by other WDEV. The WDEV transmits the first OFDMA frame to other WDEVs and receives a second OFDMA frame from the WDEVs based on some RUs specified within the first OFDMA frame. The WDEV then generates and transmits a third OFDMA frame to the other WDEVs (e.g., based on RU(s) spanning RU(s) within which information is received in the second OFDMA frame).

23 Claims, 15 Drawing Sheets

(56) References Cited

U.S. PATENT DOCUMENTS

| | | | |
|---|---|---|---|
| 2015/0124690 A1 | 5/2015 | Merlin et al. | |
| 2016/0044533 A1 | 2/2016 | Seok | |
| 2016/0262173 A1* | 9/2016 | Josiam | H04B 7/0452 |
| 2017/0149523 A1* | 5/2017 | Li | H04B 7/0452 |
| 2017/0311289 A1* | 10/2017 | Kim | H04L 5/0044 |

OTHER PUBLICATIONS

Office Action from German Patent Application No. DE102017004016.8, dated Oct. 17, 2019, 9 pages.

* cited by examiner

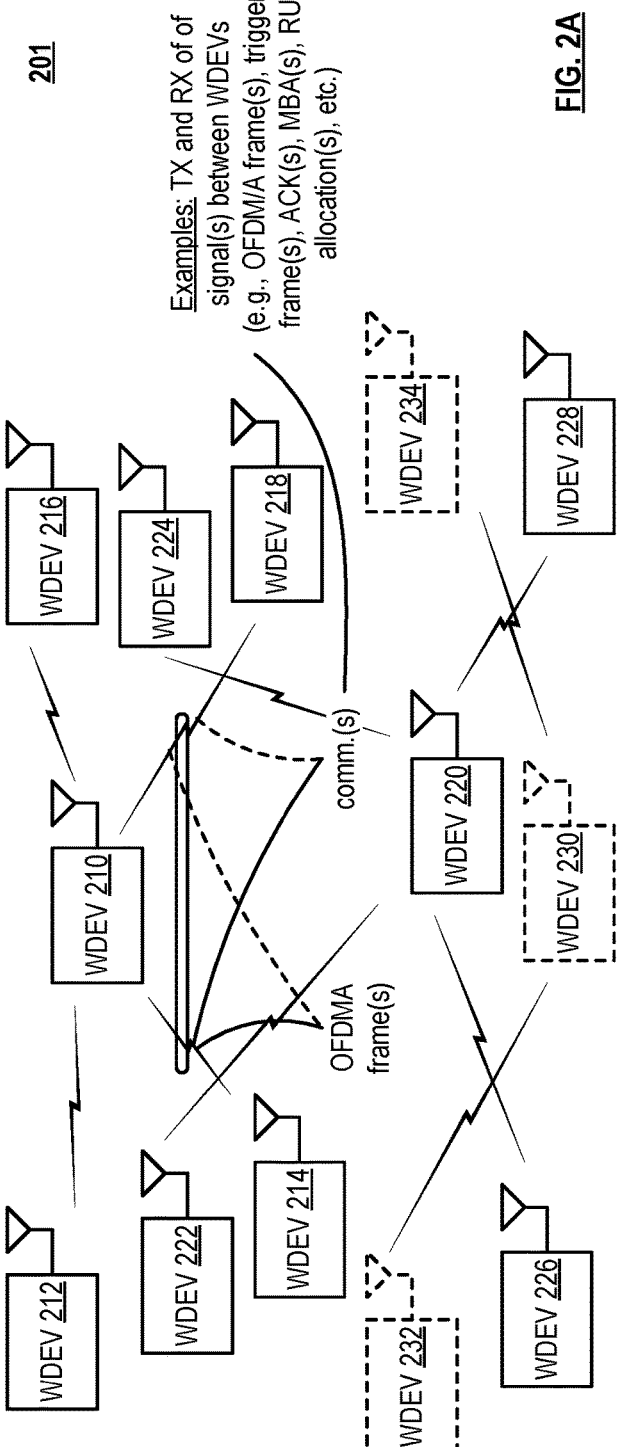
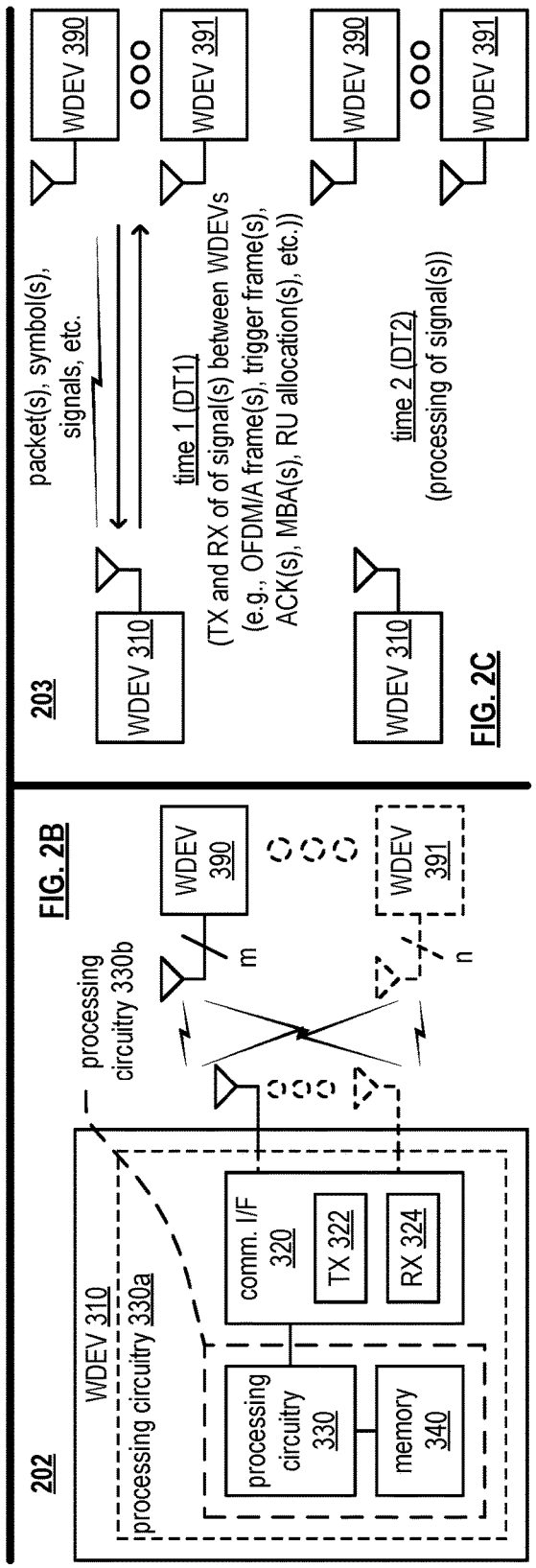

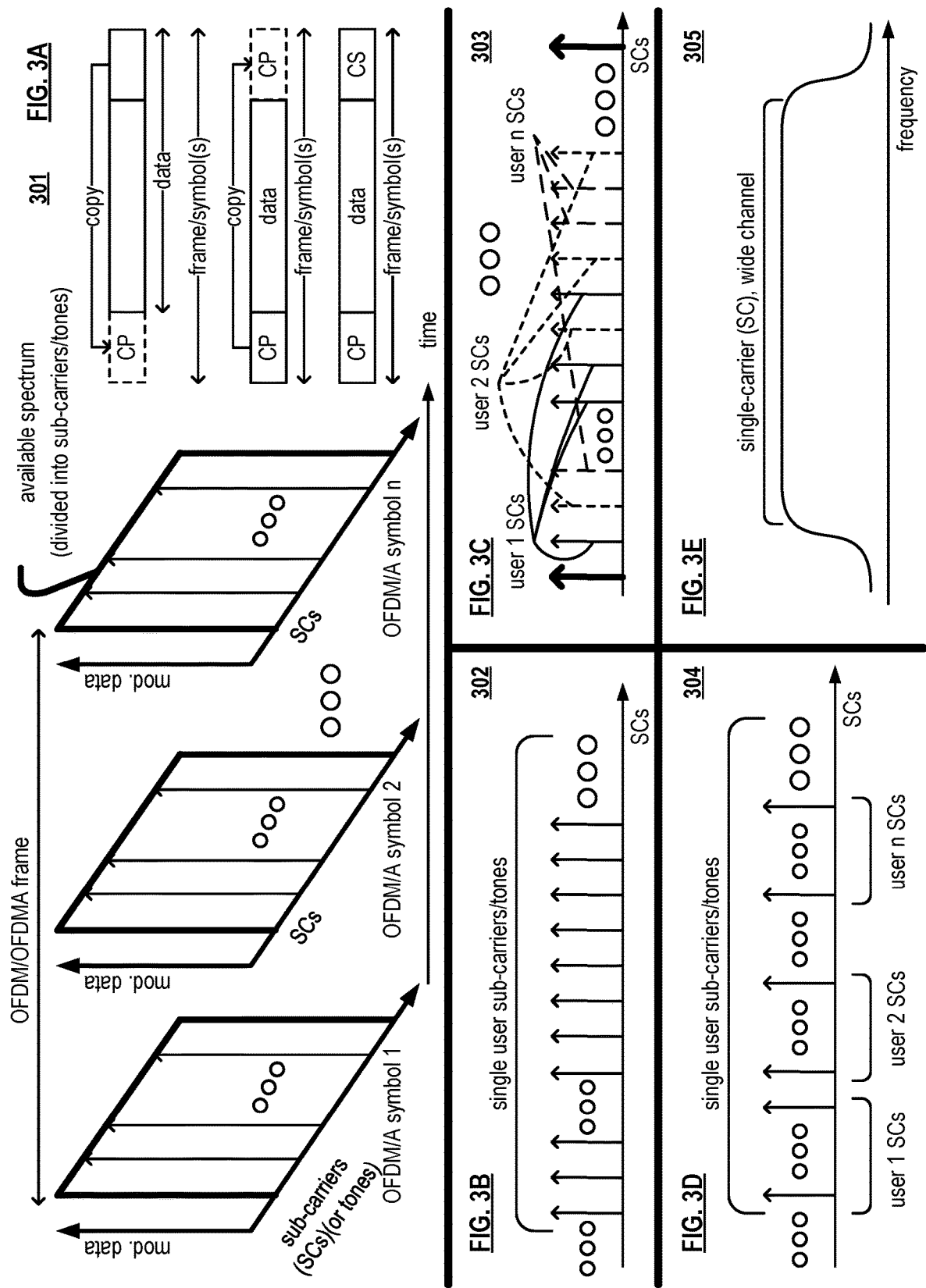

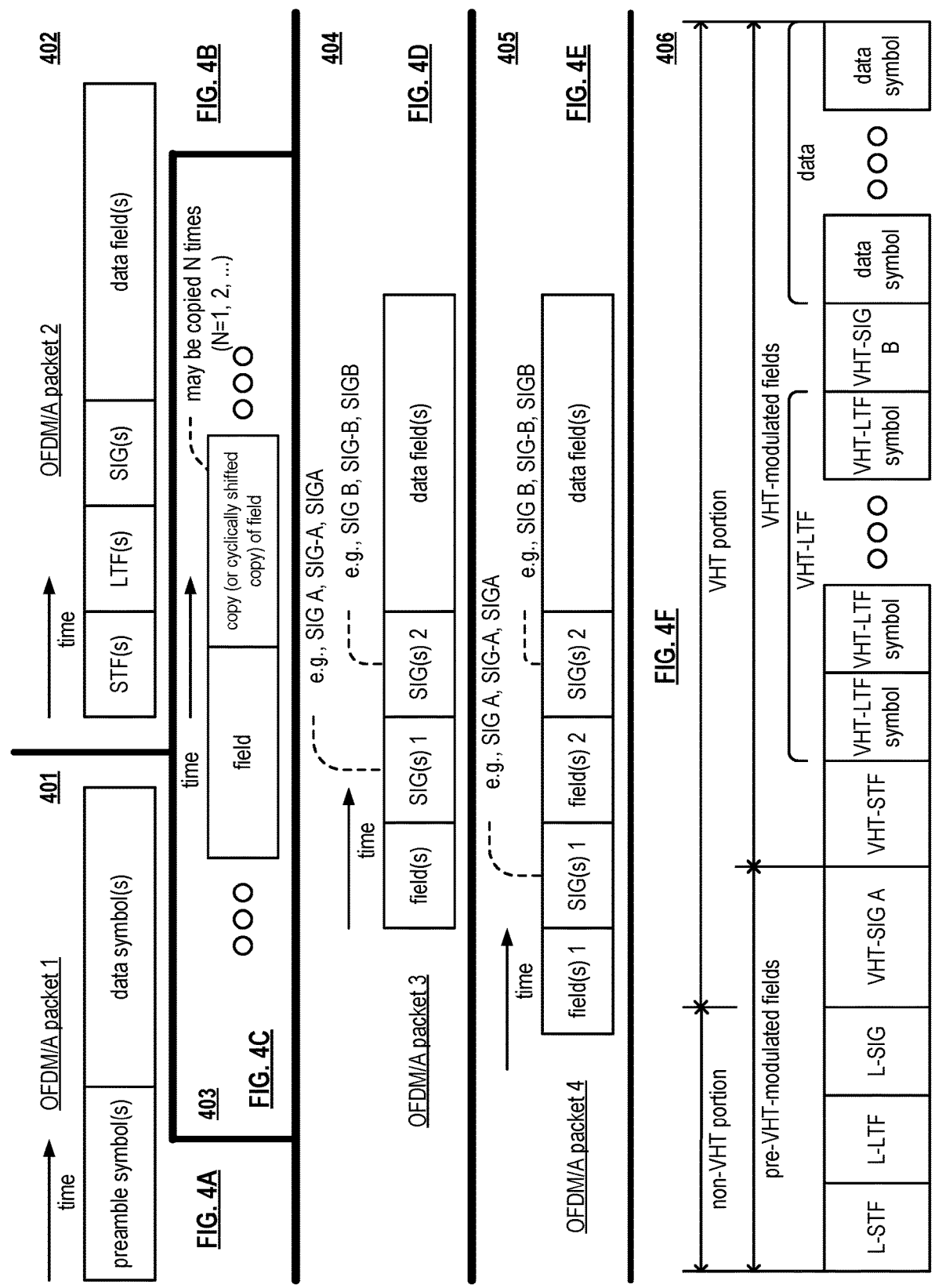

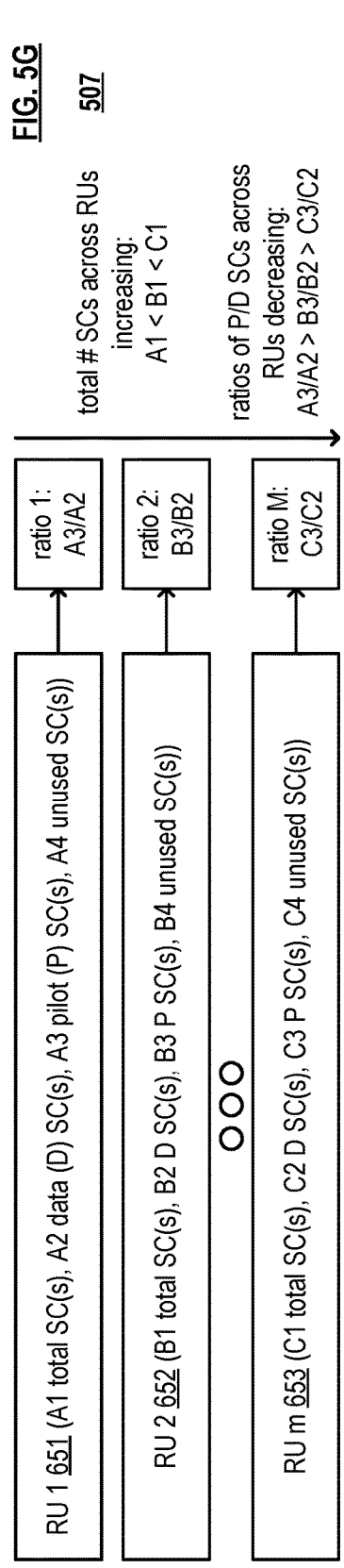

FIG. 5A 501

L-SIG/R-L-SIG | HE-SIG-A1 | HE-SIG-A2 | HE-STF ooo

OFDM/A packet A

FIG. 5B 502

L-SIG/R-L-SIG | HE-SIG-A1 | HE-SIG-A2 | HE-SIG-A3 | HE-SIG-A4 | HE-STF ooo

OFDM/A packet B

FIG. 5C 503

L-SIG/R-L-SIG | HE-SIG-A1 | HE-SIG-A2 | HE-SIG-B | HE-STF ooo

OFDM/A packet C copy (or cyclically shifted copy) of L-SIG(s), may be copied N times (N=1, 2, …)

FIG. 5D 504

L-STF(s) | L-LTF(s) | RL-SIG(s) | HE-SIG-A | HE-STF(s) | HE-LTF(s) | Packet Extension ooo OFDM/A packet D

FIG. 5E 505 ooo L-SIG(s) | RL-SIG(s) | HE-SIG-A ooo

OFDM/A packet E

FIG. 5F 506

OFDM/A frame structure selection (e.g., by processing circuitry 330, or 330a, or 330b)

OFDM/A frame structures 350

OFDM/A frame structure 1 351
OFDM/A frame structure 2 352
ooo
OFDM/A frame structure n 353

Resource Unit (RU) 1 551
RU 2 552
ooo
RU m 553

FIG. 5G 507

RU 1 651 (A1 total SC(s), A2 data (D) SC(s), A3 pilot (P) SC(s), A4 unused SC(s))
RU 2 652 (B1 total SC(s), B2 D SC(s), B3 P SC(s), B4 unused SC(s))
ooo
RU m 653 (C1 total SC(s), C2 D SC(s), C3 P SC(s), C4 unused SC(s))

ratio 1: A3/A2
ratio 2: B3/B2
ratio M: C3/C2 total # SCs across RUs increasing:
A1 < B1 < C1 ratios of P/D SCs across RUs decreasing:
A3/A2 > B3/B2 > C3/C2

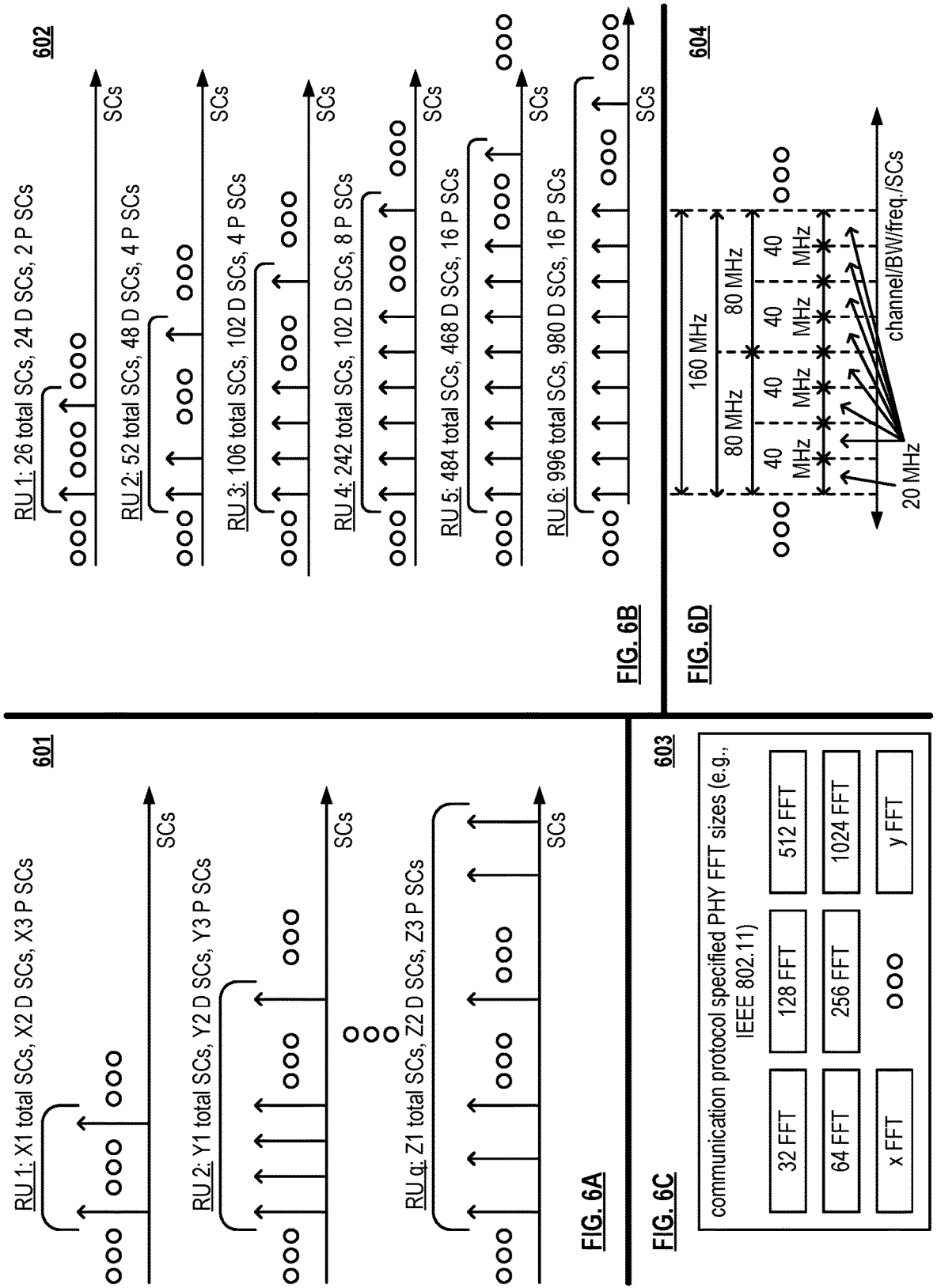

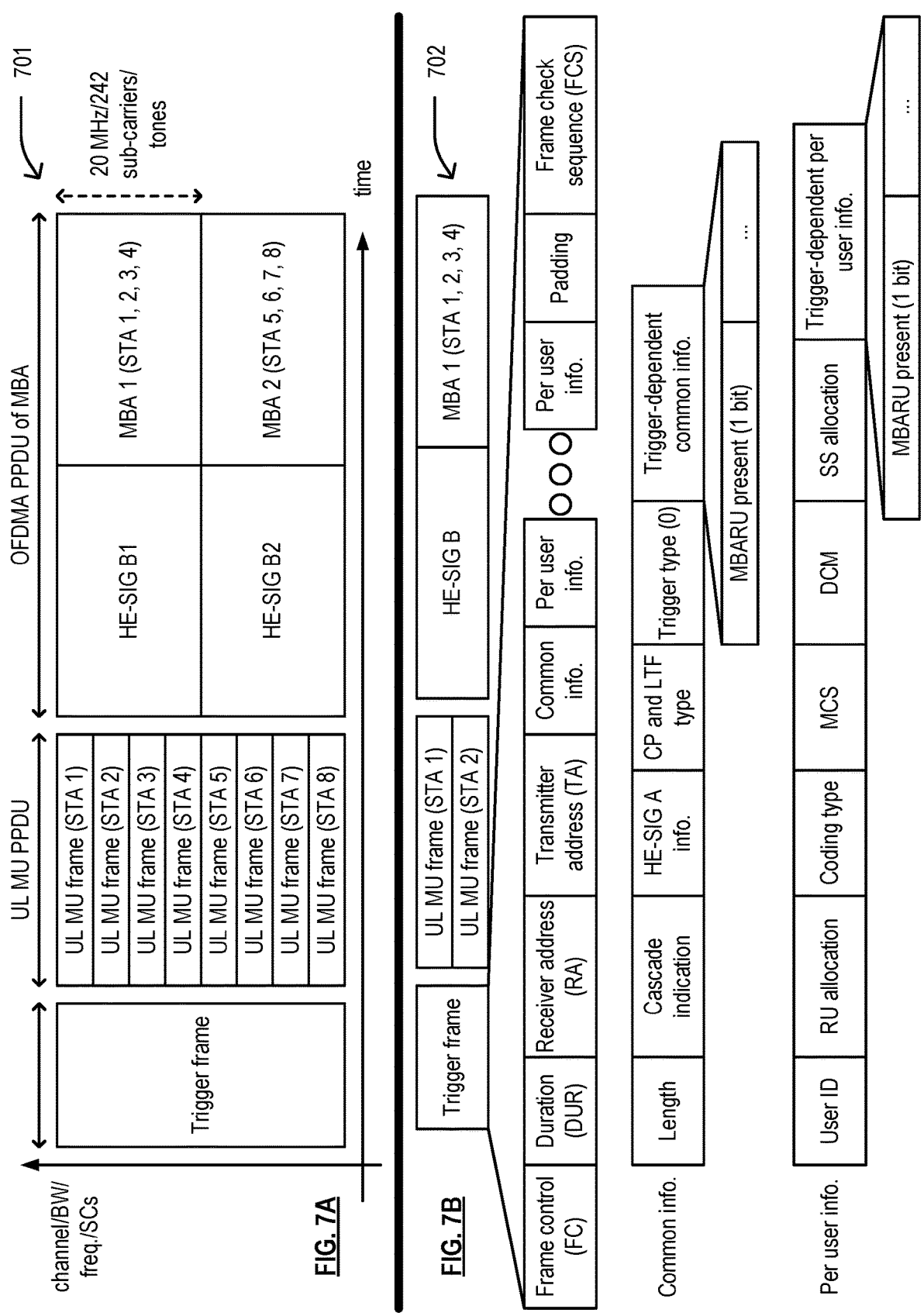

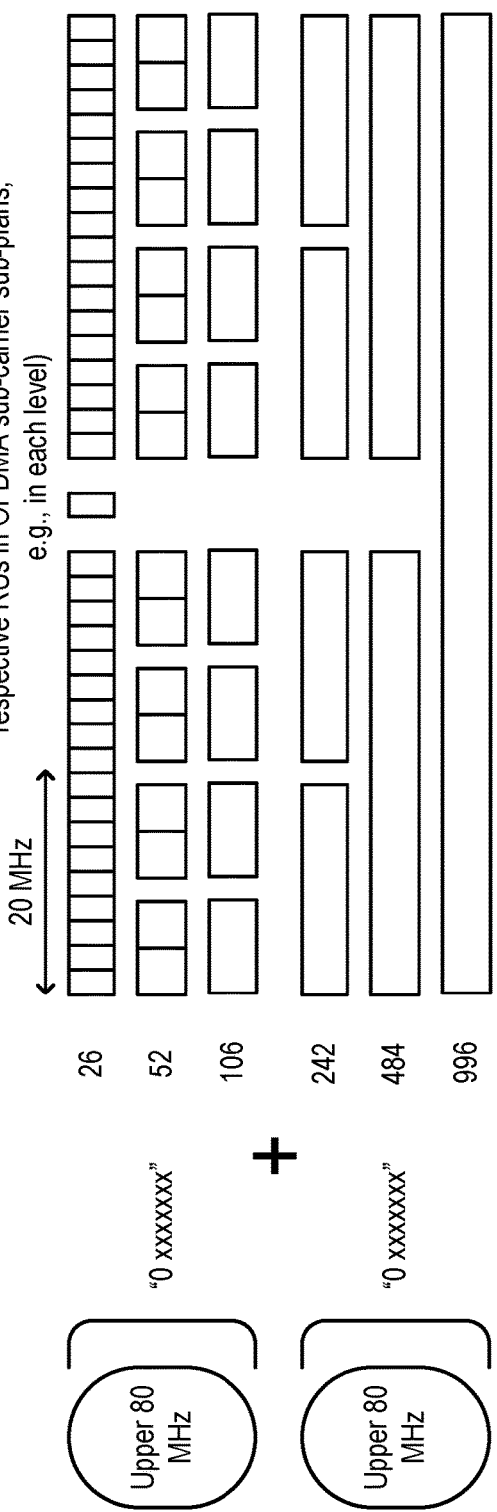

FIG. 9A   901

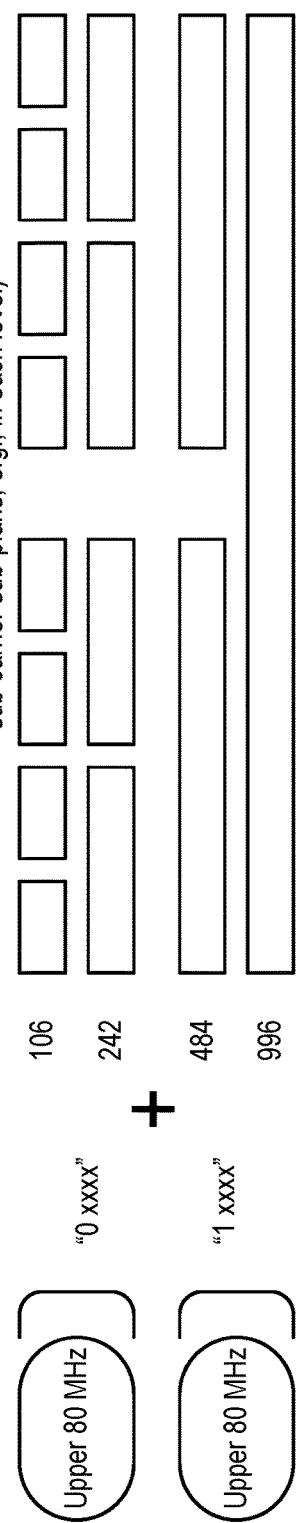

106
242
+
484
996

"0 xxxx"  Upper 80 MHz

"1 xxxx"  Upper 80 MHz

RUs of OFDMA sub-carrier plan (showing respective RUs in OFDMA sub-carrier sub-plans, e.g., in each level)

FIG. 9B   902    4 bits indices (value of xxxx)

| 4 bit indices | message | # entries |
|---|---|---|
| 0000 ~ 0111 | possible 106 RU cases in 80 MHz | 8 |
| 1000 ~ 1011 | possible 242 RU cases in 80 MHz | 4 |
| 1100 ~ 1101 | possible 484 RU cases in 80 MHz | 2 |
| 1110 | possible 996 RU cases in 80 MHz | 1 |
| 1111 | 106 MHz/80+80 MHz case | 1 |
| Total | | 16 |

* there is 1 preceding bit x indicates if the RU is on the upper or lower 80 MHz (FIG. 9B, 9D)

FIG. 9C   903

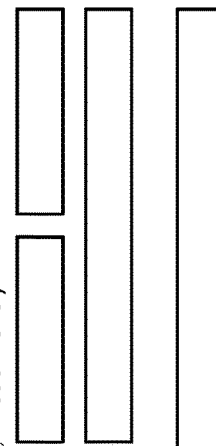

242
+
484
996

"0 xxx"  Upper 80 MHz

"1 xxx"  Lower 80 MHz

FIG. 9D   904    3 bits indices (value of xxx)

| 3 bit indices | message | # entries |
|---|---|---|
| 000 ~ 011 | possible 242 RU cases in 80 MHz | 4 |
| 100 ~ 101 | possible 484 RU cases in 80 MHz | 2 |
| 110 | possible 996 RU cases in 80 MHz | 1 |
| 111 | 106 MHz/80+80 MHz case | 1 |
| Total | | 8 |

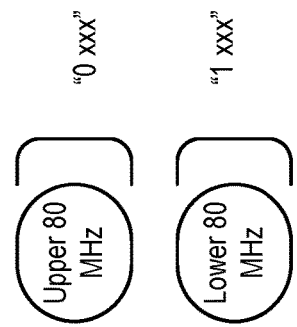

RUs of OFDMA sub-carrier plan (showing respective RUs in OFDMA sub-carrier sub-plans, e.g., in each level)

| 8 bits indices | #1 | #2 | #3 | #4 | #5 | #6 | #7 | #8 | #9 | Number of entries |
|---|---|---|---|---|---|---|---|---|---|---|
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | 26 | 26 | | 1 |
| 000 0 0011 | 26 | 26 | 26 | 26 | 26 | 52 | | 52 | | 1 |
| 000 0 0100 | 26 | 26 | 52 | 26 | 26 | 26 | 26 | 26 | | 1 |
| 000 0 0101 | 26 | 26 | 52 | 26 | 26 | 26 | 26 | 52 | | 1 |
| 000 0 0110 | 26 | 26 | 52 | 26 | 26 | 52 | 26 | 26 | | 1 |
| 000 0 0111 | 26 | 26 | 52 | 26 | 26 | 52 | | 52 | | 1 |
| 000 0 1000 | 52 | | 26 | 26 | 26 | 26 | 26 | 26 | 26 | 1 |
| 000 0 1001 | 52 | | 26 | 26 | 26 | 26 | 26 | 52 | | 1 |
| 000 0 1010 | 52 | | 26 | 26 | 26 | 52 | 26 | 26 | | 1 |
| 000 0 1011 | 52 | | 26 | 26 | 26 | 52 | | 52 | | 1 |
| 000 0 1100 | 52 | | 52 | | 26 | 26 | 26 | 26 | 26 | 1 |
| 000 0 1101 | 52 | | 52 | | 26 | 26 | 26 | 52 | | 1 |
| 000 0 1110 | 52 | | 52 | | 26 | 52 | 26 | 26 | | 1 |
| 000 0 1111 | 52 | | 52 | | Definition TBD | | | | | 1 |
| 000 1 xxxx | | | | | | | | | | 16 |
| 0010 0 yyy | 26 | 26 | 26 | 26 | 26 | 106 | | | | 8 |
| 0010 1 yyy | 26 | 26 | 26 | 52 | | 106 | | | | 8 |
| 0011 0 yyy | 52 | | 26 | 26 | 26 | 106 | | | | 8 |
| 0011 1 yyy | 52 | | 52 | | 26 | 106 | | | | 8 |
| 0100 0 yyy | 106 | | | | 26 | 26 | 26 | 26 | 26 | 8 |
| 0100 1 yyy | 106 | | | | 26 | 26 | 26 | 52 | | 8 |
| 0101 0 yyy | 106 | | | | 26 | 52 | 26 | 26 | | 8 |
| 0101 1 yyy | 106 | | | | 26 | 52 | | 52 | | 8 |
| 011 1 xxxxx | | | | | Definition TBD | | | | | 32 |
| 10 yyy yyy | 106 | | | | 26 | 106 | | | | 64 |
| 11 0 00yyy | | | | | 242 | | | | | 8 |
| 11 0 01yyy | | | | | 484 | | | | | 8 |
| 11 0 10yyy | | | | | 996 | | | | | 8 |
| 11 0 11yyy | | | | | 2*996 | | | | | 8 |
| 11 1 xxxxx | | | | | Definition TBD | | | | | 32 |

NOTE: 'yyy' = 000~111 indicates number of STAs multiplexed in an RU. Binary vector is indexed as indicates + 1 STAs multiplexed in the RU.

The definition for entries with 'x' bits is TBD.

FIG. 11A

• PPDU sequence

| Trigger frame | UL MU frame (STA 1) | HE-SIG B Common | HE-SIG B Per user | MBA 1 (STA 1, 2, 3, 4) |
|---|---|---|---|---|
| | UL MU frame (STA 2) | | | |

Fields of the HE-SIG-B per user field SU case

| Bit | subfield | Number of bits |
|---|---|---|
| TBD | STA-ID | 11 |
| TBD | NSTS | 3 |
| TBD | Tx beamforming | 1 |
| TBD | MCS | 4 |
| TBD | DCM | 1 |
| TBD | Coding | 1 |

Fields of the HE-SIG-B for a MU-MIMO allocation

| Bit | subfield | Number of bits |
|---|---|---|
| TBD | STA-ID | 11 |
| TBD | Spatial configuration | 4 |
| TBD | MCS | 4 |
| TBD | DCM | 1 |
| TBD | Coding | 1 |

If the 26 RU allocation marked in ▨ is used for UL transmission, then the RUs marked as ▨ Are allowed for DL OFDMA MU-BA, as per rule indicated

20 MHz 26
52
106
242
484
996

1102

RESOURCE UNIT (RU) ALLOCATION FOR DOWNLINK (DL) MULTI-BLOCK ACKNOWLEDGEMENT (M-BA) FOR UPLINK (UL) MULTIPLE USER (MU) WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. § 119(e) to U.S. Provisional Application No. 62/328,914, entitled "Resource unit (RU) allocation for downlink (DL) multi-block acknowledgement (M-BA) for uplink (UL) multiple user (MU) wireless communications," filed Apr. 28, 2016, U.S. Provisional Patent App. Ser. No. 62/476,075, entitled "Resource unit (RU) allocation for downlink (DL) multi-block acknowledgement (MBA) for uplink (UL) multiple user (MU) wireless communications," filed Mar. 24, 2017, both of which are hereby incorporated herein by reference in their entirety and made part of the present U.S. Utility Patent Application for all purposes.

BACKGROUND

Technical Field

The present disclosure relates generally to communication systems; and, more particularly, to signaling and communications within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Communications may be made between various wireless communication devices within various wireless communication systems in various ways. The prior art does not provide adequate means in some types of wireless communication systems to specify specifically where certain information may be included within such communications between those wireless communication devices. Moreover, as wireless communication systems continue to become more densely populated and complex, there continues to be a need for improved ways in which such signaling and communication may be performed between wireless communication devices to effectuate efficient use of the communication medium.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 5F is a diagram illustrating an example of selection among different OFDM/A frame structures for use in communications between wireless communication devices and specifically showing OFDM/A frame structures corresponding to one or more resource units (RUs).

FIG. 5G is a diagram illustrating an example of various types of different resource units (RUs).

FIG. 6A is a diagram illustrating another example of various types of different RUs.

FIG. 6B is a diagram illustrating another example of various types of different RUs.

FIG. 6C is a diagram illustrating an example of various types of communication protocol specified physical layer (PHY) fast Fourier transform (FFT) sizes.

FIG. 6D is a diagram illustrating an example of different channel bandwidths and relationship there between.

FIG. 7A is a diagram illustrating an example of signal exchanges between wireless communication devices.

FIG. 7B is a diagram illustrating an example of a trigger frame for use in signal exchanges between wireless communication devices.

FIG. 8A is a diagram illustrating an example of a multi-block acknowledgement (M-BA) allocation field.

FIG. 8B is a diagram illustrating an example of table showing bits indices for the M-BA allocation field of FIG. 8A.

FIG. 9A is a diagram illustrating another example of a M-BA RU allocation field.

FIG. 9B is a diagram illustrating a table showing bits indices for the M-BA RU allocation field of FIG. 9A.

FIG. 9C is a diagram illustrating another example of a M-BA RU allocation field.

FIG. 9D is a diagram illustrating a table showing bits indices for the M-BA RU allocation field of FIG. 9C.

FIG. 11A is a diagram illustrating an example of a DL M-BA HE-SIG B per user information.

FIG. 11B is a diagram illustrating an example of semi-implicit RU signaling.

DETAILED DESCRIPTION

Figure 1:
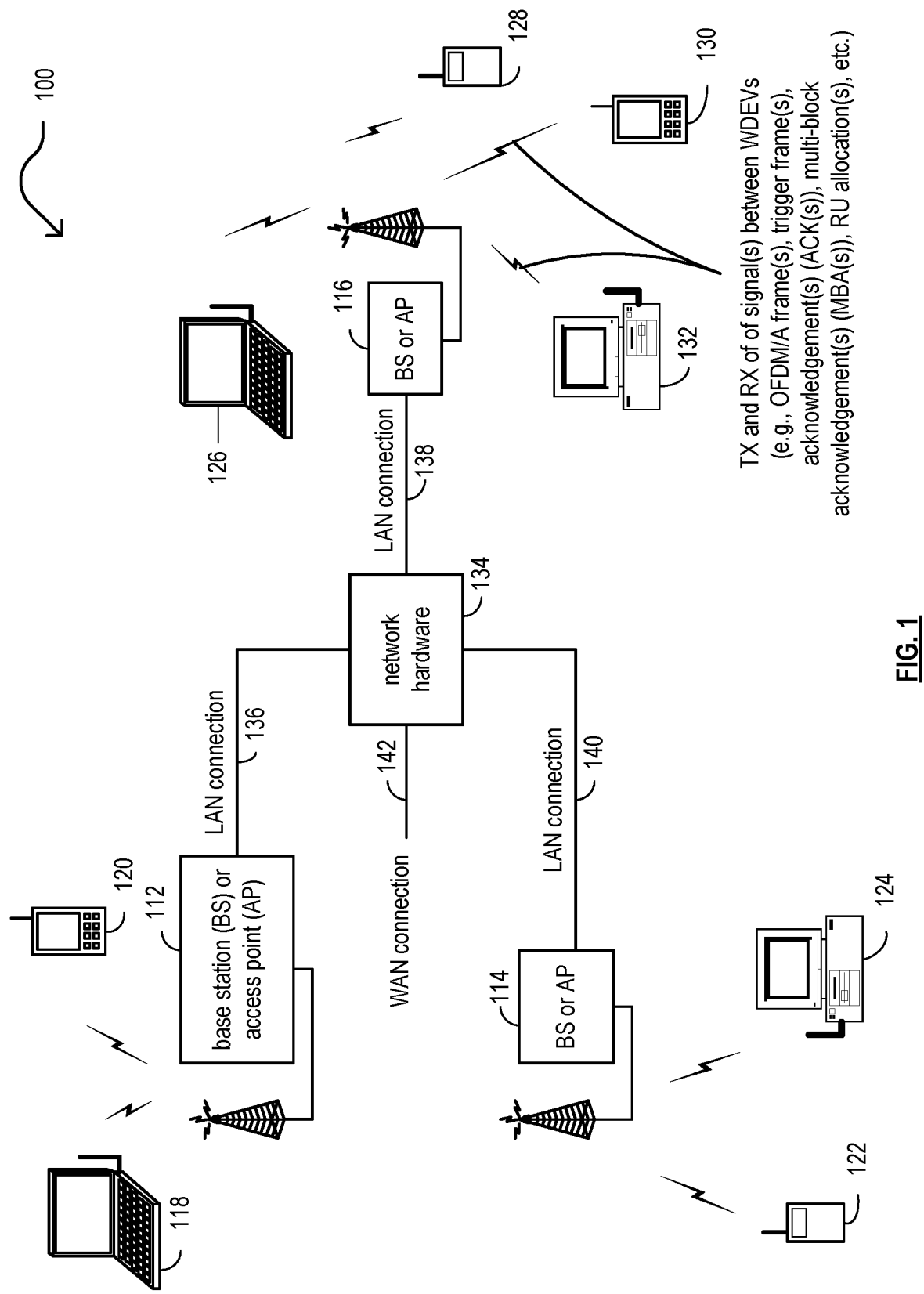
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes a processing circuitry to support communications with one or more of the other wireless communication devices (e.g., any other of the WDEVs 118-132 and BSs or APs 112-116). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 118-132 and BSs or APs 112-116) includes a processing circuitry and a communication interface configured to support communications with one or more of the other wireless communication devices (e.g., any other of the WDEVs 118-132 and BSs or APs 112-116).

In an example of operation and implementation, a wireless communication device (e.g., BS/AP 116) supports communications with a plurality of other wireless communication devices (e.g., WDEVs 130, 132). The wireless communication device (e.g., BS/AP 116) is configured to generate a first orthogonal frequency division multiple access (OFDMA) frame that specifies a plurality of resource units (RUs) to be used by the plurality of other wireless communication devices (e.g., WDEVs 130 and 132) when transmitting a second OFDMA frame to the wireless communication device. The wireless communication device (e.g., BS/AP 116) is configured to transmit the first OFDMA frame to the plurality of other wireless communication devices (e.g., WDEVs 130 and 132). The wireless communication device (e.g., BS/AP 116) is then configured to receive the second OFDMA frame from the plurality of other wireless communication devices (e.g., WDEVs 130 and 132) based on the plurality of RUs specified within the first OFDMA frame.

In some examples, the second OFDMA frame includes first information from a first of the plurality of other wireless communication devices (e.g., WDEV 130) modulated within a first of the plurality of RUs as specified in the first OFDMA frame and second information from a second of the plurality of other wireless communication devices (e.g., WDEV 132) modulated within a second of the plurality of RUs as specified in the first OFDMA frame. The wireless communication device (e.g., BS/AP 116) is then configured to generate, based on receipt of the second OFDMA frame, a third OFDMA frame. In some examples, this third OFDMA frame includes a first response to the first information from the first of the plurality of other wireless communication devices (e.g., WDEV 130) modulated within a first RU that spans the first of the plurality of RUs and a second response to the second information from the second of the plurality of other wireless communication devices (e.g., WDEV 132) modulated within a second RU that spans the second of the plurality of RUs. The wireless communication device (e.g., BS/AP 116) is then configured to transmit the third OFDMA frame to the plurality of other wireless communication devices (e.g., WDEVs 130 and 132).

In certain examples, the first OFDMA frame includes a trigger frame. Also, in various examples, the second OFDMA frame includes an uplink (UL) multi-user (MU) PLCP Protocol Data Unit (PPDU), such that PLCP corresponds to Physical Layer Convergence Procedure. In addition, the third OFDMA frame includes a multi-block acknowledgement (M-BA). In these and/or some other examples, this M-BA includes a first acknowledgement (ACK) that is based on receipt of the first information from the first of the plurality of other wireless communication devices (e.g., WDEV 130) and also a second ACK that is based on receipt of the second information from the second of the plurality of other wireless communication devices (e.g., WDEV 132).

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, WDEV 210 supports communications with a plurality of other wireless communication devices (e.g., WDEVs 214, 218). The WDEV 210 is configured to generate a first orthogonal frequency division multiple access (OFDMA) frame that specifies a plurality of resource units (RUs) to be used by the plurality of other wireless communication devices (e.g., WDEVs 214, 218) when transmitting a second OFDMA frame to the wireless communication device. The WDEV 210 is configured to transmit the first OFDMA frame to the plurality of other wireless communication devices (e.g., WDEVs 214, 218). The WDEV 210 is then configured to receive the second OFDMA frame from the plurality of other wireless communication devices (e.g., WDEVs 214, 218) based on the plurality of RUs specified within the first OFDMA frame. In some examples, the second OFDMA frame includes first information from a first of the plurality of other wireless communication devices (e.g., WDEVs 214) modulated within a first of the plurality of RUs as specified in the first OFDMA frame and second information from a second of the plurality of other wireless communication devices (e.g., WDEVs 218) modulated within a second of the plurality of RUs as specified in the first OFDMA frame. The WDEV 210 is then configured to generate, based on receipt of the second OFDMA frame, a third OFDMA frame. In some examples, this third OFDMA frame includes a first response to the first information from the first of the plurality of other wireless communication devices (e.g., WDEVs 214) modulated within a first RU that spans the first of the plurality of RUs and a second response to the second information from the second of the plurality of other wireless communication devices (e.g., WDEVs 218) modulated within a second RU that spans the second of the plurality of RUs. The WDEV 210 is then configured to transmit the third OFDMA frame to the plurality of other wireless communication devices (e.g., WDEVs 214, 218).

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, one processing circuitry 330b may be implemented to include the processing circuitry 330 and the memory 340 yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. In even other examples, the device 310 includes processing circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. At or during a first time (e.g., time 1 ($\Delta T1$)), the WDEV 310 transmits signal(s) to WDEV 390, and/or the WDEV 390 transmits other signal(s) to WDEV 310. At or during a second time (e.g., time 2 ($\Delta T2$)), the WDEV 310 processes signal(s) received from WDEV 390, and/or the WDEV 390 processes signal(s) received from WDEV 310.

In certain examples, type of signals, frames, etc. transmitted between the WDEV 310 and the WDEVs 390-391 include trigger frame(s), multi-block acknowledgement(s) (M-BA(s)) such as an uplink (UL) multi-user (MU) PLCP Protocol Data Unit (PPDU) (where PLCP is Physical Layer Convergence Procedure PLCP) that is transmitted from WDEVs 3901-391 in response to a prior downlink (DL) signal, frame, etc. that is transmitted from the WDEV 310 to the WDEVs 390-391.

In an example of operation and implementation, the WDEV 310 supports communications with WDEVs 130, 132. The WDEV 310 is configured to generate a trigger frame (e.g., which may be an OFDMA frame) that specifies certain information. In some examples, the trigger frame specifies a first plurality of resource units (RUs) to be used by WDEVs 390-391 when transmitting a second OFDMA frame to the wireless communication device and also a second plurality of RUs within which the WDEVs 390-391 are to receive a third OFDMA frame from the wireless communication device.

Then, the WDEV 310 is then configured to transmit the trigger frame to the WDEVs 390-391. The WDEV 310 is then configured to receive a UL MU PPDU (e.g., which may also be an OFDMA frame) from the WDEVs 390-391 based on the first plurality of RUs specified within the trigger frame. In accordance with OFDMA signaling, note that the second OFDMA frame may include first information from the WDEV 390 and second information from the WDEV 391. Then, based on receipt of the second UL MU PPDU, the WDEV 310 is then configured to generate a M-BA (e.g., which may also be an OFDMA frame). The WDEV 310 is then configured to transmit the M-BA to the WDEVs 390-391 based on the second plurality of RUs specified within the trigger frame.

In another example of operation and implementation, the WDEV 310 supports communications with WDEVs 130, 132. The WDEV 310 is configured to generate a trigger frame (e.g., which may be an OFDMA frame) that specifies certain information. In some examples, the trigger frame specifies a first plurality of resource units (RUs) to be used by WDEVs 390-391 when transmitting a second OFDMA frame to the wireless communication device.

Then, the WDEV 310 is then configured to transmit the trigger frame to the WDEVs 390-391. The WDEV 310 is then configured to receive a UL MU PPDU (e.g., which may also be an OFDMA frame) from the WDEVs 390-391 based on the first plurality of RUs specified within the trigger frame. In accordance with OFDMA signaling, note that the second OFDMA frame may include first information from the WDEV 390 and second information from the WDEV 391. Then, based on receipt of the second UL MU PPDU, the WDEV 310 is then configured to generate a M-BA (e.g., which may also be an OFDMA frame). The WDEV 310 is then configured to transmit the M-BA to the WDEVs 390-391 based on a second plurality of RUs that are specified a portion of the M-BA before the actual respective acknowledgement(s) (ACK(s)) within the M-BA. For example, the second plurality of RUs may be specified within one or more signal fields (SIGs) within the M-BA that precede the actual respective ACK(s) within the M-BA. With respect to this example of operation and implementation, note that the information that includes within which RU(s) the actual respective ACK(s) within the M-BA are include is self-contained within the M-BA itself. A receiver WDEV receives and processes an earlier portion of the M-BA to determine where the corresponding actual respective ACK(s) within the M-BA are located in terms of RU(s).

Also, in yet another example of operation and implementation, the WDEV 310 supports communications with WDEVs 130, 132. The WDEV 310 is configured to generate a trigger frame (e.g., which may be an OFDMA frame) that specifies certain information. In some examples, the trigger frame specifies a first plurality of resource units (RUs) to be used by WDEVs 390-391 when transmitting a second OFDMA frame to the wireless communication device.

Then, the WDEV 310 is then configured to transmit the trigger frame to the WDEVs 390-391. The WDEV 310 is then configured to receive a UL MU PPDU (e.g., which may also be an OFDMA frame) from the WDEVs 390-391 based on the first plurality of RUs specified within the trigger frame. In accordance with OFDMA signaling, note that the second OFDMA frame may include first information from the WDEV 390 and second information from the WDEV 391. Then, based on receipt of the second UL MU PPDU, the WDEV 310 is then configured to generate a M-BA (e.g., which may also be an OFDMA frame) that includes the actual respective ACK(s) within the M-BA within RU(s) that spans the respective one or more RUs within which the information was received from the WDEVs 390-391.

For example, if the WDEV 390 transmits first information within a first RU and the WDEV 391 transmits second information within a second RU, then an ACK to the first information from the WDEV 390 received by the WDEV 310 will be included within and/or spanning an RU of the M-BA that includes and/or spans the RU within which the first information from the WDEV 390 was received by the WDEV 310, and another ACK to the second information from the WDEV 391 received by the WDEV 310 will be included within and/or spanning another RU of the M-BA that includes and/or spans another RU within which the second information from the WDEV 391 was received by the WDEV 310. Note that the ACK to the first information from the WDEV 390 and the other ACK to the second information from the WDEV 391 may be one or more ACKs (e.g., a single ACK may be used in some instances to acknowledge both the first information from WDEV 390 and the second information from the WDEV 391).

In certain examples, the WDEV 310 transmits a first OFDMA frame that includes a trigger frame to WDEVs 390-391. The WDEV 310 receives a second OFDMA frame from the WDEVs 390-391 that includes the first information from WDEV 390 modulated within a first of the first plurality of RUs as specified in the first OFDMA frame (e.g., trigger frame) and also includes second information from the WDEV 391 modulated within a second of the first plurality of RUs as specified in the first OFDMA frame (e.g., trigger frame) and also third information from a third WDEV (e.g., another WDEV in addition to WDEVs 390-391) modulated within a third of the first plurality of RUs as specified in the first OFDMA frame (e.g., trigger frame). The WDEV 310 is then configured to generate a third OFDMA frame that includes a multi-block acknowledgement (M-BA). The WDEV 310 is then configured to transmit the third OFDMA frame that includes the M-BA to WDEVs 390-391 and the other WDEV in addition to WDEVs 390-391. The M-BA includes a first acknowledgement (ACK) that is based on receipt of the first information from the WDEV 390 within the first of the first plurality of RUs, wherein the first ACK is modulated within a first of the second plurality of RUs as specified in the first OFDMA frame (e.g., trigger frame). the M-BA also includes a second ACK that is based on receipt of both the second information from the WDEV 391 modulated within the second of the first plurality of RUs and the third information from the other WDEV in addition to WDEVs 390-391 modulated within the third of the first plurality of RUs. Note that the second ACK is modulated within a second of the second plurality of RUs as specified in the first OFDMA frame that spans the second of the first plurality of RUs and the third of the first plurality of RUs.

In even other examples in which a first, second, and third OFDMA frame are transmitted among the WDEV 310 and WDEVs 390-391 (and/or other WDEV in addition to WDEVs 390-391), the WDEV 310 is configured to receive a fourth OFDMA frame that includes third information from the WDEV 390 modulated within a first of the first plurality of RUs as specified in the first OFDMA frame and fourth information from the WDEV 391 modulated within a second of the first plurality of RUs as specified in the first OFDMA frame. The WDEV 310 is configured to generate, based on receipt of the fourth OFDMA frame, a fifth OFDMA frame.

This fifth OFDMA includes a multi-block acknowledgement (M-BA). This M-BA includes a first signal field (SIG) for the WDEV 390 modulated within a first at least one RU of at least one of the first plurality of RUs or the second plurality of RUs that specifies a first RU of at least one of the first plurality of RUs or the second plurality of RUs within which the WDEV 390 is to receive a first acknowledgement (ACK) from the wireless communication device that is based on receipt of the third information from the WDEV 390 modulated within the first of the first plurality of RUs. Also, note that the first ACK is subsequent to the first SIG within the fifth OFDMA frame. This M-BA also includes a second SIG for the WDEV 391 modulated within a second at least one RU of at least one of the first plurality of RUs or the second plurality of RUs that specifies a second RU of at least one of the first plurality of RUs or the second plurality of RUs within which the WDEV 391 is to receive a second ACK from the wireless communication device that is based on receipt of the fourth information from the WDEV 391 modulated within the second of the first plurality of RUs. Also, note that the second ACK is subsequent to the second SIG within the fifth OFDMA frame. The WDEV 310 is then configured to transmit the fifth OFDMA frame to the WDEVs 390-391.

In even other examples in which a first, second, and third OFDMA frame are transmitted among the WDEV 310 and WDEVs 390-391 (and/or other WDEV in addition to WDEVs 390-391), the WDEV 310 is configured to receive a fourth OFDMA frame that includes third information from the WDEV 390 modulated within a first of the first plurality of RUs as specified in the first OFDMA frame and fourth information from the WDEV 391 modulated within a second of the first plurality of RUs as specified in the first OFDMA frame. The WDEV 310 is then configured to generate, based on receipt of the fourth OFDMA frame, a fifth OFDMA frame that includes a multi-block acknowledgement (M-BA). This M-BA includes a first acknowledgement (ACK), based on receipt of the third information from the WDEV 390, that is modulated within a first RU that spans the first of the first plurality of RUs as specified in the first OFDMA frame and within which the third information from the WDEV 390 is modulated within the fourth OFDMA frame. This M-BA also includes a second ACK, based on receipt of the fourth information from the WDEV 391, which is modulated within a second RU that spans the second of the first plurality of RUs as specified in the first OFDMA frame and within which the fourth information from the WDEV 391 is modulated within the fourth OFDMA frame.

In even other examples, the WDEV 310 is configured to generate the first OFDMA frame that specifies the first plurality of RUs to be used by the WDEVs 390-391 when transmitting the second OFDMA frame to the WDEV 310 based on a plurality of wireless station (STA) identifiers (IDs) within the first OFDMA frame that specifies respectively which of the first plurality of RUs are assigned to which of the WDEVs 390-391. Note that a first of the plurality of STA IDs within the first OFDMA frame specifies a first of the first plurality of RUs that is assigned to the WDEV 390 that is followed by a second of the plurality of STA IDs within the first OFDMA frame specifies a second of the first plurality of RUs that is assigned to the WDEV 391.

In another example of implementation and operation, the WDEV 310 includes both a processing circuitry to perform many of the operations described above and also includes a communication interface, coupled to the processing circuitry, that are configured in combination to support communications within a satellite communication system, a wireless communication system, a wired communication system, a fiber-optic communication system, and/or a mobile communication system. For example, certain operations may be performed by only the processing circuitry, other certain operations may be performed by only the communication interface, and even some other certain operations may be performed by both the processing circuitry and the communication interface.

In some examples, the communication interface is configured to transmit the first OFDMA frame and/or the third OFDMA frame to WDEV 390 and/or WDEV 391. Also, the communication interface is configured to receive the second OFDMA frame from WDEVs 390-391. In some other examples, the processing circuitry is configured to transmit the first OFDMA frame and/or the third OFDMA frame to WDEV 390 and/or WDEV 391 via the communication interface. Also, the processing circuitry is configured to receive the second OFDMA frame from WDEVs 390-391 via the communication interface. In even other examples, both the communication interface and the communication interface operate cooperatively and are configured to generate, process, transmit, etc. the first OFDMA frame and/or the third OFDMA frame to WDEV 390 and/or WDEV 391. Also, the communication interface and the communication interface operate cooperatively and are configured to receive, process, etc. the second OFDMA frame from WDEVs 390-391.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots X_{N-Ncp}, \ldots, x_{N-1}$, where the $x_{N-Ncp}$ bit is the first bit of the end portion of the data portion that is to be copied, then the bits $x_{N-Ncp}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a and/or processing circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one or more first signal fields (SIG(s) 1) followed by one or more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one or more first signal fields (SIG(s) 1) followed by one or more second fields followed by one or more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 6D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 5F is a diagram illustrating an example 506 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 551. In another example, OFDM/A frame structure 1 351 is composed of at least one RU 1 551 and at least one RU 2 552. In another example, OFDM/A frame structure 1 351 is composed of at least one RU 1 551, at least one RU 2 552, and at least one RU m 553. Similarly, the OFDM/A frame structure 2 352 up through OFDM/A frame structure n 353 may be composed of any combinations of the various RUs (e.g., including any one or more RU selected from the RU 1 551 through RU m 553).

FIG. 5G is a diagram illustrating an example 507 of various types of different resource units (RUs). In this example 502, RU 1 551 includes A1 total sub-carrier(s), A2 data (D) sub-carrier(s), A3 pilot (P) sub-carrier(s), and A4 unused sub-carrier(s). RU 2 552 includes B1 total sub-carrier(s), B2 D sub-carrier(s), B3 P sub-carrier(s), and B4 unused sub-carrier(s). RU N 553 includes C1 total sub-carrier(s), C2 D sub-carrier(s), C3 P sub-carrier(s), and C4 unused sub-carrier(s).

Considering the various RUs (e.g., across RU 1 551 to RU N 553), the total number of sub-carriers across the RUs increases from RU 1 551 to RU N 553 (e.g., A1<B1<C1). Also, considering the various RUs (e.g., across RU 1 551 to RU N 553), the ratio of pilot sub-carriers to data sub-carriers across the RUs decreases from RU 1 551 to RU N 553 (e.g., A3/A2>B3/B2>C3/C2).

In some examples, note that different RUs can include a different number of total sub-carriers and a different number of data sub-carriers yet include a same number of pilot sub-carriers. As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to 9 users with 242 sub-carriers—(9 users×26 RUs)=8 unused sub-carriers between the users. In yet another example, four (4) 64 FFT users are multiplexed with 242 sub-carriers—(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

FIG. 6A is a diagram illustrating another example 601 of various types of different RUs. In this example 601, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 601, note that different RUs can include different spacing between the sub-carriers, different sub-carrier densities, implemented within different frequency bands, span different ranges within at least one frequency band, etc.

FIG. 6B is a diagram illustrating another example 602 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 484 total sub-carriers, which is 2× the 242 total sub-carriers of RU 4).

FIG. 6C is a diagram illustrating an example 603 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 6D is a diagram illustrating an example 604 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

In a wireless communication system (e.g., wireless local area network (WLAN/WiFi) system, etc.) in which a central controller wireless communication device (e.g., access point (AP), AP-operative wireless station (STA), etc.) makes decisions about which device(s) (e.g., other wireless communication devices (WDEVs), other wireless stations (STAs), etc.) may access the medium, resources (e.g., resource units (RUs)) are allocated after consideration of competing resource requests from participating device(s) (e.g., other WDEVs, other STAs, etc.).

The central controller wireless communication device (e.g., an access point (AP)) provides resource allocations for each given phase of data exchange, where each phase of data exchange might provide resource allocations to more than one participating STA corresponding to a single window of time.

The resource allocations for different device(s) (e.g., other WDEVs, other STAs, etc.) are orthogonal through various means (e.g. frequency orthogonal, spatially orthogonal, etc.).

The central controller WDEV (e.g., AP) indicates the resource allocation for each of the device(s) (e.g., other WDEVs, other STAs, etc.) in a broadcasted frame (e.g., a trigger frame or some other signal).

A device (e.g., other WDEV, other STA, etc.) will prepare data for transmission to the central controller WDEV (e.g., AP) after parsing the resource allocation information conveyed in the trigger frame and discovering a resource allocation allocated to itself. Multiple devices (e.g., other WDEVs, other STAs, etc.) coordinated by the central controller WDEV (e.g., AP) then transmit uplink multi-user (UL MU) data frames to the central controller WDEV (e.g., AP). In general, note that reference to a STA and/or AP in various examples of operation herein may be any type of wireless communication device (e.g., AP, STA, etc.). Such reference of AP, STA, and/or user, etc. are used for illustration in various examples, but they may generally be viewed as being any types of wireless communication devices.

FIG. 7A is a diagram illustrating an example 701 of signal exchanges between wireless communication devices.

In an example of operation, a central controller WDEV (e.g., AP), after receiving the UL MU data, acknowledges the reception of data by sending MU OFDMA block acknowledgement (BA), single user (SU) multi-block acknowledgement (M-BA) or multiple user (MU) M-BA.

This disclosure proposes multiple Resource Unit (RU) allocation and indication methods for a central controller WDEV (e.g., AP) to transmit acknowledgement information to multiple recipients (e.g., M-BA).

One approach operates by carrying the RU allocation of the DL M-BA in a DL frame. For example, the signaling method may be performed inside of Trigger PLCP Protocol Data Unit (PPDU) (where PLCP is Physical Layer Convergence Procedure PLCP). The signaling method may be performed using a special wireless station (STA) identifier (ID)(STA-ID) in SIG-B of the physical layer (PHY) header of the DL PPDU.

One approach operates by using a semi-implicit RU for the DL M-BA based on UL RU of preceding PPDU. For example, the RU for M-BA is based on the RU used by a STA for the preceding UL MU PPDU. Such signaling method may be performed by using a special STA-ID in SIG-B of the PHY header of the DL PPDU that contains the acknowledgement information.

Design Option 1:

FIG. 7B is a diagram illustrating an example 702 of a trigger frame for use in signal exchanges between wireless communication devices.

Option 1: allocation information in a type-specific field of trigger frame.

In the Common information (info.) field of the trigger frame, set the trigger type to be zero (e.g. which indicates normal UL data transmission trigger). In the trigger-dependent Common Info field, set the M-BA RU Present bit to one.

In the Per User information (info.) field, when the M-BA RU present bit has the value 1, then the M-BA RU Allocation field is present in each Trigger-dependent Per User Info field. Also, in the Per User Info field, in the trigger-dependent Per User Info field, set the M-BA RU Allocation field to the value that indicates the RU allocation of DL M-BA for the corresponding STA. Also, in the Per User Info field, the M-BA RU allocation field may have different length according to the pattern and the size of the RU.

Design Option 1A:

FIG. 8A is a diagram illustrating an example 801 of a multi-block acknowledgement (M-BA) allocation field. Note that the 7 bit indices xxxxxxx value can be found in the table of FIG. 8B.

FIG. 8B is a diagram illustrating an example 802 of table showing bits indices for the M-BA allocation field of FIG. 8A. To indicate the RU that will be used for receiving the DL M-BA, the following 7 bits Table 1 (FIG. 10) may be used to indicate an RU that ranges from 26 to 996 tones and is located within the bandwidth from 20 to 160 MHz. 8 bits are needed for each user to indicate M-BA RU Allocation. 1 of the 8 bits indicates a portion of the BW (e.g. upper 80, lower 80 MHz). Remaining 7 bits indicate further refinement of allocation as per the table of FIG. 8A.

Design Option 1B:

FIG. 9A is a diagram illustrating another example 901 of a M-BA RU allocation field. Note that the 4 bit indices xxxx value can be found in the table of FIG. 9B.

FIG. 9B is a diagram illustrating a table 902 showing bits indices for the M-BA RU allocation field of FIG. 9A.

Optional Encoding of the M-BA RU Allocation Field:

To indicate the RU that will be used for receiving the DL M-BA, the following 4 bits Table 2 may be used to indicate a RU that ranges from 106 to 996 tones and is located within the bandwidth from 20 to 160 MHz. 5 bits are needed for each user to indicate M-BA RU Allocation. 1 of the 4 bits indicates a portion of the BW (e.g. upper 80, lower 80 MHz). Remaining 4 bits indicate further refinement of allocation as per Table 2.

Design Option 1C:

FIG. 9C is a diagram illustrating another example 903 of a M-BA RU allocation field. Note that the 3 bit indices xxx value can be found in the table of FIG. 9D.

FIG. 9D is a diagram illustrating a table 904 showing bits indices for the M-BA allocation field of FIG. 9C.

Encoding of the M-BA RU Allocation Field:

To indicate the RU that will be used for receiving the DL M-BA, the following 4 bits Table 3 may be used to indicate a RU that ranges from 242 to 996 tones and is located within the bandwidth from 20 to 160 MHz. 4 bits are needed for each user to indicate M-BA RU Allocation. 1 of the 4 bits indicates a portion of the BW (e.g. upper 80, lower 80 MHz). Remaining 3 bits indicate further refinement of allocation as per Table 2.

Design Options 1A, 1B, 1C Compared:

As can be seen, Design Option 1A allows more allocation choices for DL M-BA. This option uses the relatively largest number of bits (e.g., 8 bits per user in the trigger PPDU).

As can be seen, Design Option 1C allows the fewest possible allocation choices for DL M-BA. This option uses the relatively fewest number of bits to signal DL M-BA allocations (e.g., 4 bits per user in the trigger PPDU).

Figure 10:
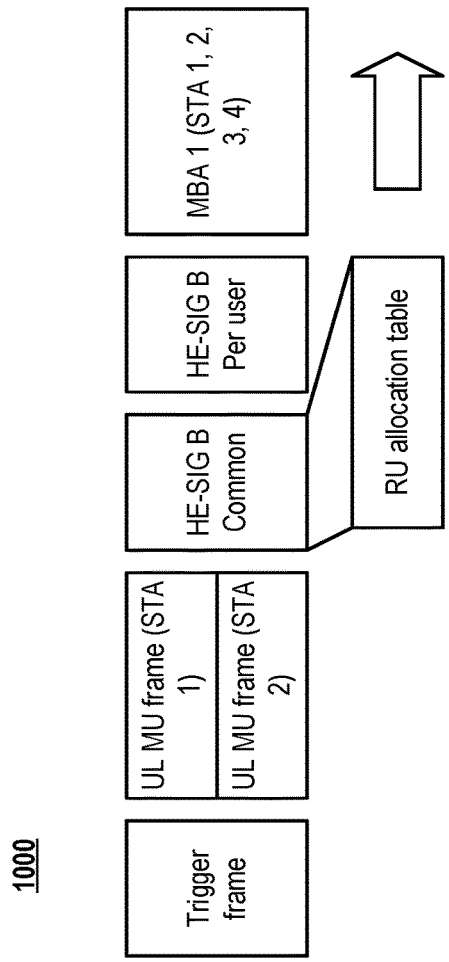
FIG. 10 is a diagram illustrating an example of a downlink (DL) M-BA HE-SIG B common information.

Design Option 1 Showing DL M-BA HE-SIG B Common Information:

FIG. 10 is a diagram illustrating an example 1000 of a downlink (DL) M-BA HE-SIG B common information.

HE SIG-B Common Content for the DL M-BA:

Any entry of this Table in this diagram may be used to indicate the RU allocation on the 20 MHz channel. Columns in the Table represent tone allocations (RUs) for specific receivers. A Special ID value will appear in the per-user information portion of the HE SIGB field. In the table at the right hand side of the diagram, note that entries with xxxx (e.g., Definition TBD), xxxxx (e.g., Definition TBD), yyy, or yyy yyy indicate that more than one receiver will use one of the tone allocations indicated in the corresponding row (e.g., the largest tone value).

Figure 13:
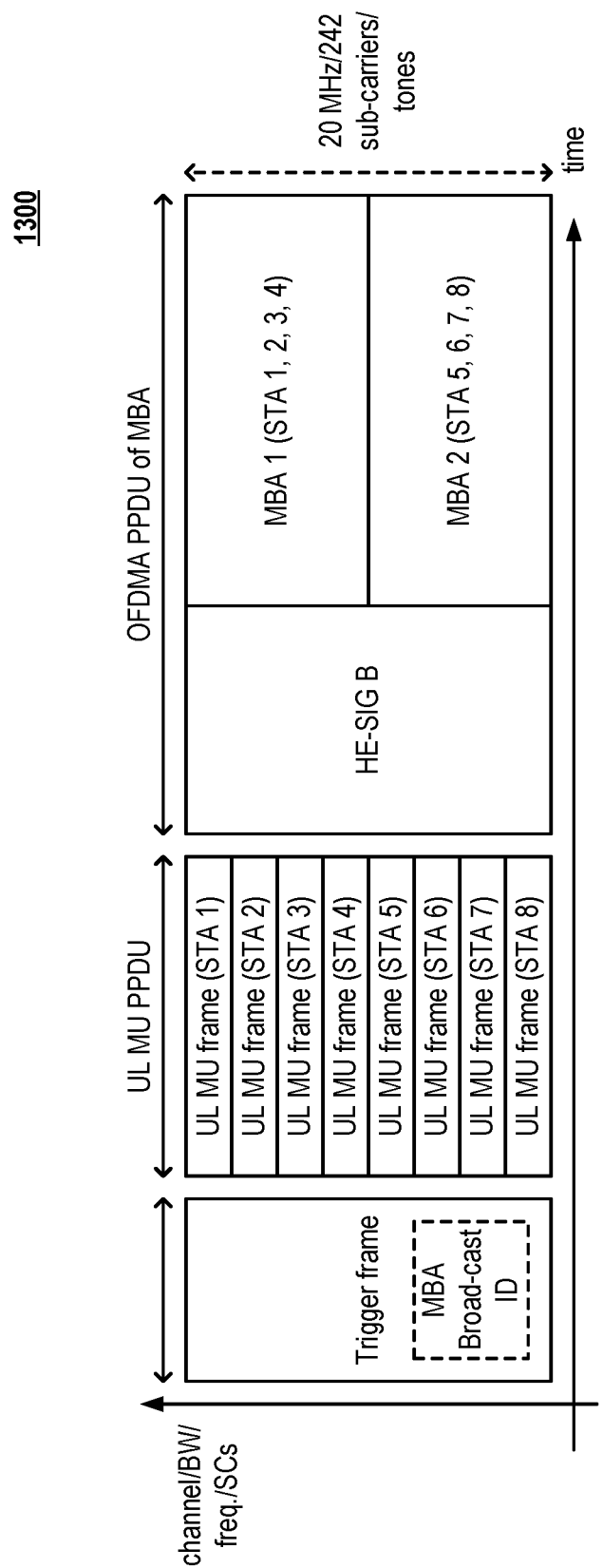
FIG. 13 is a diagram illustrating another example of HE-SIG B per user information that includes broadcast STA ID.

Design Option 1 HE-SIG B Per User Information:

SIG-B Per User Content within the DL PPDU that contains M-BA Frames:

A STA that finds its STA ID in any per user STA ID field uses the relative position of that per-user info field within the list of per user fields to find its tone allocation (e.g., the STA matching the STA ID found in the first per-user info field uses the tone allocation in the column marked #1 in the HE SIGB common content Table in FIG. 13). Also, in some examples, the STA matching the STA ID found in the second per-user info field uses the tone allocation in the column marked #2 in the HE SIGB common Table in FIG. 13.

Each user identifies whether a per-user spatial allocation Table is present per the values in the common Table. A spatial allocation Table will be present in the per-user subfield when more than one receiver is directed to a specific tone allocation in the common Table. This may also be present if only one receiver is identified by the STA ID.

The presence of a special STA-ID value in a per-user field indicates that the associated RU is for multiple receiving STAs. The corresponding tone allocation column in the HE SIGB common content Table for the per-user field still matches the position of the per user field within the list of per user fields. Within a PPDU, the special STA-ID value that corresponds to the general Broadcast ID indicates an RU for any STA that does not have an RU indicated by a single-STA-ID value in any per-user field within the same PPDU.

The special STA-ID value that corresponds to the Broadcast ID can be defined to mean some subset of all STAs, such as only STA that are expecting to receive an acknowledgement and that are not otherwise identified by a STA ID value in other per STA info fields of the same PPDU. For example, a M-BA Broadcast ID indicates any STA that is expecting to receive an M-BA and its STA-ID is not listed in any other RU allocation within the same DL PPDU. The value of the special STA-ID can be any reserved value of STA-ID. For example, an additional STA ID value indicates any STA that is no individually listed in a per STA info STA ID and is not expecting any acknowledgement information and therefore does not match the M-BA Broadcast ID. Note that these STA might find some other MAC broadcast PPDU, such as a trigger PPDU for a subsequent phase of UL OFDMA.

SIG-B per user info and payload information is passed to the next layer (e.g., media access control (MAC) layer) which determines the frame type and determines if any acknowledgement information is addressed to this STA by examining MAC addressing fields (e.g., as shown in FIG. 11A).

FIG. 11A is a diagram illustrating an example 1101 of a DL M-BA HE-SIG B per user information.

Design Option 2 Semi-Implicit RU Signaling:

FIG. 11B is a diagram illustrating an example 1102 of semi-implicit RU signaling.

An M-BA that includes user N is transmitted on the 52/106/242/484/996 RU that includes the RU used by user N for the immediately preceding UL transmission.

According to the tone plans of certain wireless communication standards, protocols, and/or recommended practices (e.g., such as with respect to the tone plan of the interim draft of the developing IEEE 802.11ax standard, the IEEE 802.11 Draft P802.11ax_D0.1.pdf), there may be only one allocation of any allowed size larger than 26 tones which includes any given 26 tone allocation. For example, the mapping from an UL OFDMA allocation to any size DL M-BA allocation is one to one when the rule of the first sub-bullet above is followed (e.g., the mapping is unambiguous).

DL M-BA PPDU allocations are based on UL PPDU allocations and therefore, there is no need for an indication of DL M-BA PPDU RU within the trigger frame that precedes the UL transmission. This is overhead friendly for SIG-B (e.g., reduces overhead). In some examples, there may be no need for per-user DL M-BA RU within the trigger PPDU.

Generalized Semi-Implicit M-BA RU Signaling:

Generally speaking, according to the tone plans of certain wireless communication standards, protocols, and/or recommended practices (e.g., such as with respect to the tone plan of the interim draft of the developing IEEE 802.11ax standard, the IEEE 802.11 Draft P802.11ax_D0.1.pdf), there may be only one allocation of any allowed size larger than X tones which includes any given tone allocation which is greater than X tones. In some examples, the mapping from an UL OFDMA allocation of any size to a DL M-BA allocation that is the same or larger size, is unambiguous. This permits many possible DL M-BA allocations to be used.

Design Option 2 HE-SIG B Per User Information:

Also, note that in some examples, with respect to SIG-B Per User content within the DL PPDU that contains M-BA frames, the SIG-B Per User content configuration of option 2 is identical to that of option 1 (e.g., many details of which are described above).

Figure 12A:
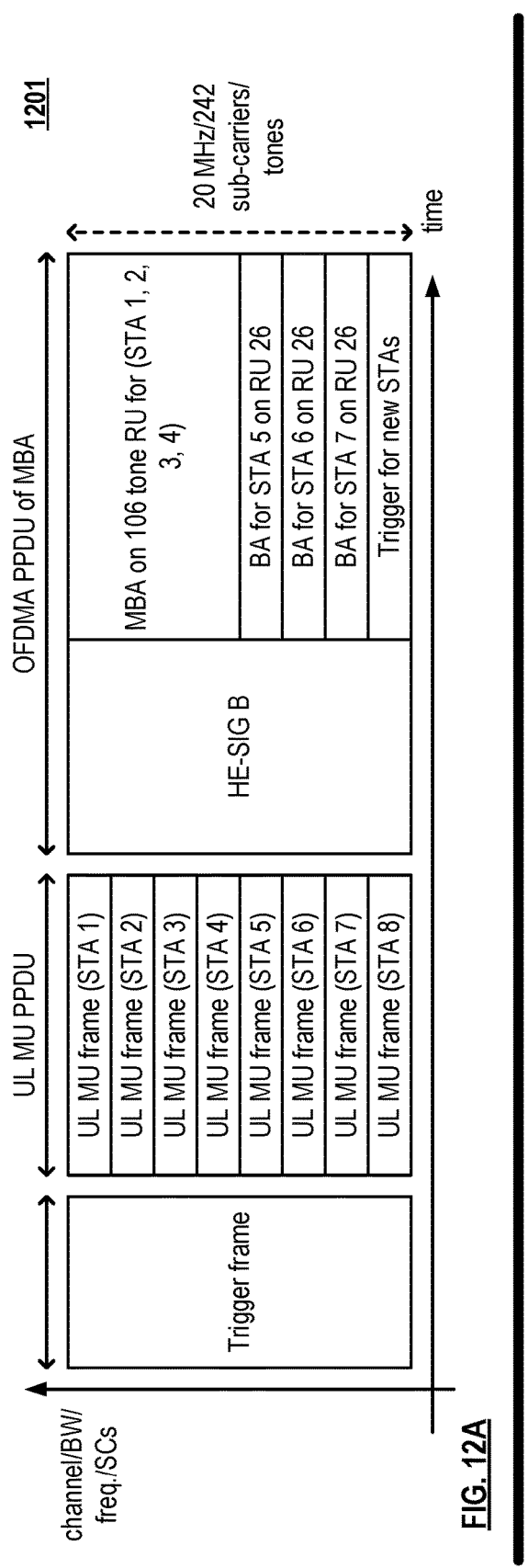
FIG. 12A is a diagram illustrating an example of HE-SIG B per user information that includes broadcast wireless station (STA) identifier (ID).

Design Option 2 Plus Broadcast Wireless Station (STA) Identifier (ID)(STA-ID) Example (1):

FIG. 12A is a diagram illustrating an example 1201 of HE-SIG B per user information that includes broadcast wireless station (STA) identifier (ID).

The Case of Only One RU for M-BA:

A STA checks whether its STA-ID is listed in the SIG-B Per User Info of OFDMA PPDU of M-BA. Each STA uses the RU corresponding to its STA ID to determine which allocation to decode in a PPDU that it is receiving (e.g. The OFDMA PPDU of M-BA).

If a STA does not find its STA ID, then the STA checks if there is a RU indicated by the M-BA Broadcast ID (In this case, there is only one RU indicated by M-BA Broadcast ID). The STAs use this RU to decode M-BA if it is expecting a M-BA (if there is only one M-BA broadcast ID present). See FIG. 12B for the case of multiple M-BA broadcast ID present.

Otherwise, the STA checks if there is a RU indicated by a general Broadcast ID (e.g., it can be only one RU that is indicated by the general Broadcast ID). The STA uses this RU to decode broadcasting data such as trigger frame.

Figure 12B:
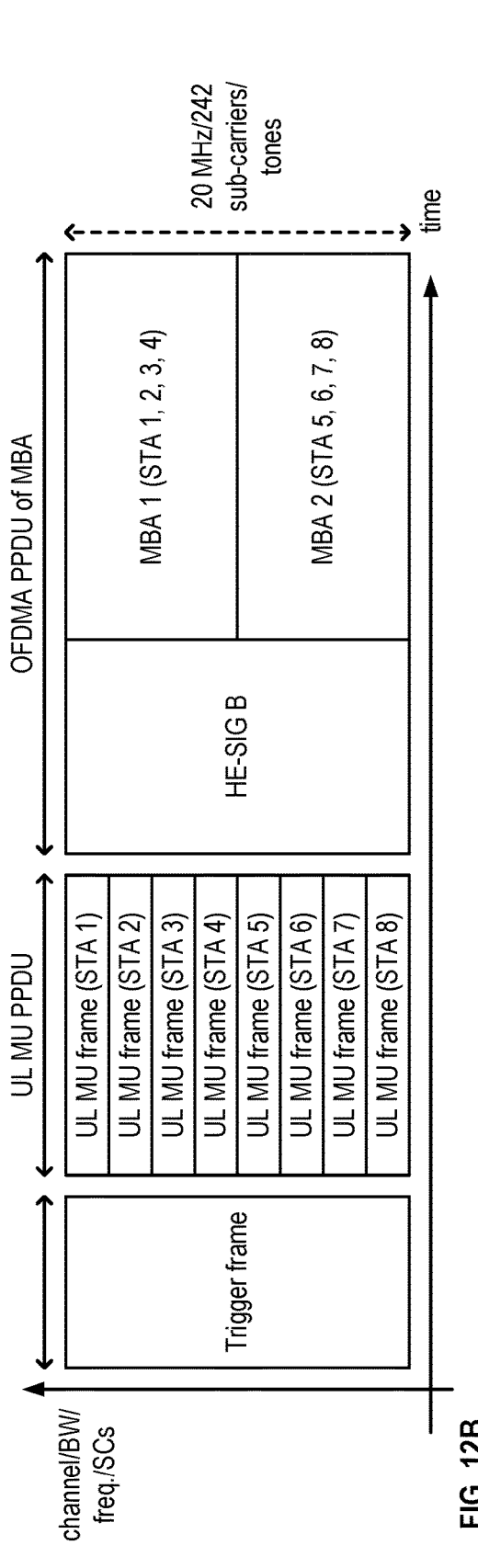
FIG. 12B is a diagram illustrating another example of HE-SIG B per user information that includes broadcast STA ID.

Design Option 2 Plus Broadcast STA STA-ID Example (2):

FIG. 12B is a diagram illustrating another example 1202 of HE-SIG B per user information that includes broadcast STA ID.

The Case of More than One RU for M-BA Using Broadcast M-BA ID: A STA checks whether its STA-ID is listed in the SIG-B Per User Info of OFDMA PPDU of M-BA. Each STA uses the RU corresponding to its STA ID to determine which allocation to decode in a PPDU that it is receiving.

If a STA does not find its STA ID, then the STA checks if there is an RU indicated by the M-BA Broadcast ID. If there is more than one M-BA Broadcast ID present, then:

The STA chooses the per user field that includes an RU that includes the RU the STA used for the preceding UL MU transmission.

As one example in one specific implementation, due to the definition of the tone plan in IEEE 802.11 P802.11ax_D0.1, the RU of any particular size that includes any given 26 tone RU is unique, there is no ambiguity as to which allocation is used for the M-BA. In some examples, the previously stated generalized form of this rule still holds in this case.

The STAs use this RU to decode M-BA if it is expecting an M-BA.

Otherwise, the STA checks if there is a RU indicated by a general Broadcast ID (it can be only one RU that is indicated by the general Broadcast ID). In some examples, the STA uses this RU to decode broadcasting data such as trigger frame.

Design Option 2 Plus Broadcast STA STA-ID Example (3):

FIG. 13 is a diagram illustrating another example 1300 of HE-SIG B per user information that includes broadcast STA ID. In some implementations, the Broadcast ID can be put in the Per User info of Trigger frame for the same purpose.

A STA checks whether its STA-ID is listed in the Per User Info of a trigger frame. Each STA uses the RU corresponding to its STA ID to determine which allocation to decode in a PPDU that it is receiving.

If a STA does not find its STA ID, then the STA checks if there is an RU indicated by the M-BA Broadcast ID. If there is more than one M-BA Broadcast ID present, then, the STA chooses the per user field that includes an RU that includes the RU the STA used for the preceding UL MU transmission.

As one example in one specific implementation, due to the definition of the tone plan in IEEE 802.11 P802.11ax_D0.1, the RU of any particular size that includes any given 26 tone RU is unique, there is no ambiguity as to which allocation is used for the M-BA. The previously stated generalized form of this rule still holds in this case. The STAs use this RU to decode M-BA if it is expecting an M-BA.

Otherwise, the STA checks if there is a RU indicated by a general Broadcast ID (it can be only one RU that is indicated by the general Broadcast ID). In some examples, the STA uses this RU to decode broadcasting data such as trigger frame.

Figure 14:
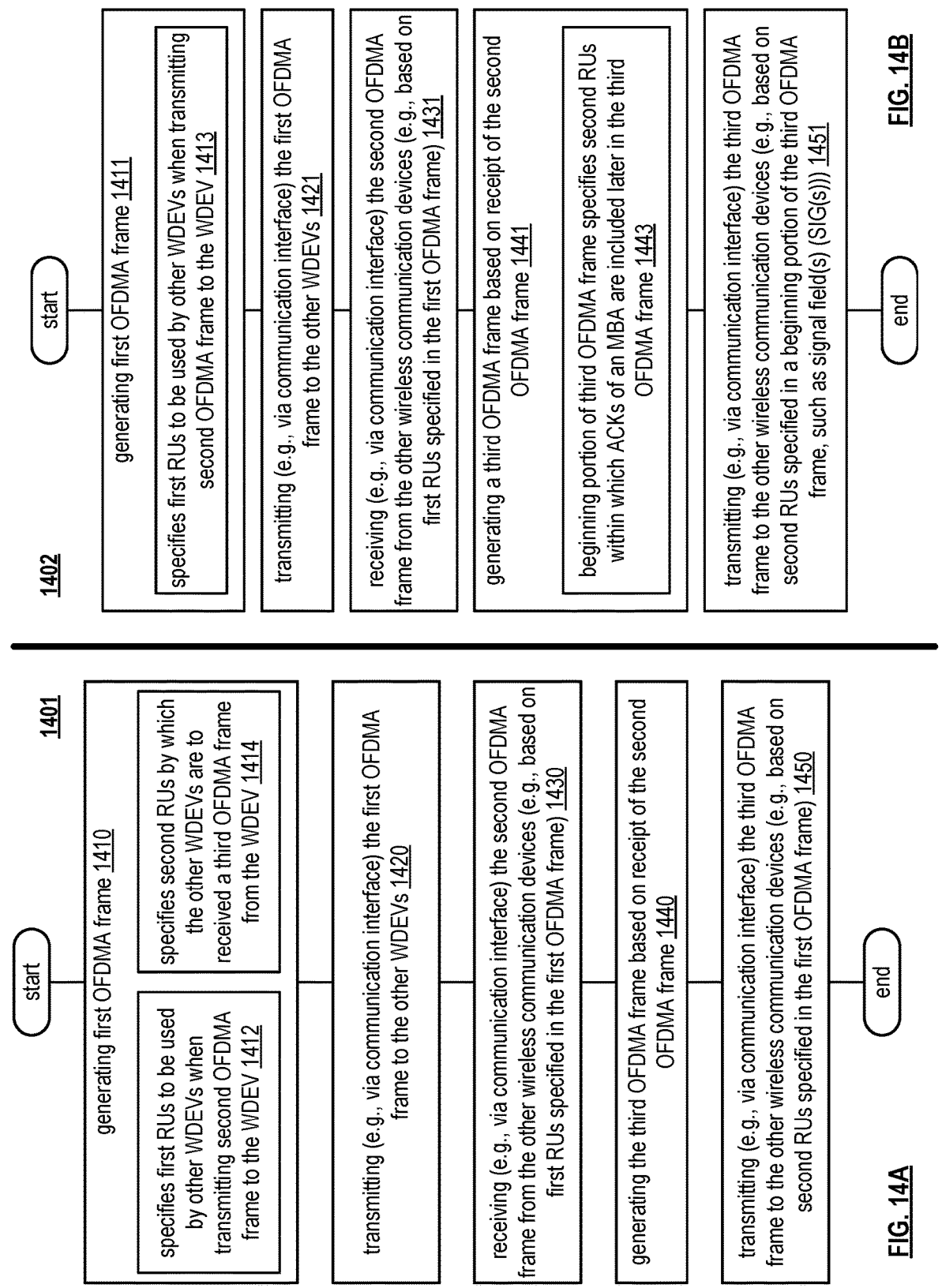
FIG. 14A is a diagram illustrating an embodiment of a method for execution by one or more wireless communication devices.
FIG. 14B is a diagram illustrating another embodiment of a method for execution by one or more wireless communication devices.

FIG. 14A is a diagram illustrating an embodiment of a method 1401 for execution by one or more wireless communication devices.

The method 1401 begins by generating a first orthogonal frequency division multiple access (OFDMA) frame (block 1410). In some examples, the first OFDMA frame includes information that specifies a first plurality of resource units (RUs) to be used by a plurality of other wireless communication devices when transmitting a second OFDMA frame to the wireless communication device (block 1412) and a second plurality of RUs within which the plurality of other wireless communication devices are to receive a third OFDMA frame from the wireless communication device (block 1414).

The method 1401 continues by transmitting (e.g., via a communication interface of the wireless communication device) the first OFDMA frame to the plurality of other wireless communication devices (block 1420).

The method 1401 then operates by receiving (e.g., via the communication interface of the wireless communication device) the second OFDMA frame from the plurality of other wireless communication devices based on the first plurality of RUs specified within the first OFDMA frame. Note that the second OFDMA frame includes first information from a first of the plurality of other wireless communication devices and second information from a second of the plurality of other wireless communication devices (block 1430).

The method 1401 continues by generating, based on receipt of the second OFDMA frame, the third OFDMA frame (block 1440). The method 1401 continues by transmitting (e.g., via the communication interface of the wireless communication device) the third OFDMA frame to the plurality of other wireless communication devices based on the second plurality of RUs specified within the first OFDMA frame (block 1450).

FIG. 14B is a diagram illustrating another embodiment of a method 1402 for execution by one or more wireless communication devices. The method 1402 begins in step 1411 by generating a first OFDMA frame (block 1411). In some examples, the first OFDMA frame includes information that specifies a first plurality of resource units (RUs) to be used by a plurality of other wireless communication devices when transmitting a second OFDMA frame to the wireless communication device (block 1413).

The method 1402 continues by transmitting (e.g., via a communication interface of the wireless communication device) the first OFDMA frame to the plurality of other wireless communication devices (block 1421).

The method 1402 then operates by receiving (e.g., via the communication interface of the wireless communication device) the second OFDMA frame from the plurality of other wireless communication devices based on the first plurality of RUs specified within the first OFDMA frame (block 1431).

The method 1401 continues by generating, based on receipt of the second OFDMA frame, the third OFDMA frame (block 1441). In some examples, the third OFDMA frame includes information that specifies second RUs. For example, a beginning portion of third OFDMA frame specifies second RUs within which ACKs of an M-BA are included later in the third OFDMA frame (block 1443).

The method 1402 continues by transmitting (e.g., via communication interface) the third OFDMA frame to the other wireless communication devices (e.g., based on second RUs specified in a beginning portion of the third OFDMA frame, such as within signal field(s) (SIG(s)) within the third OFDMA frame) (block 1451).

Figure 15:
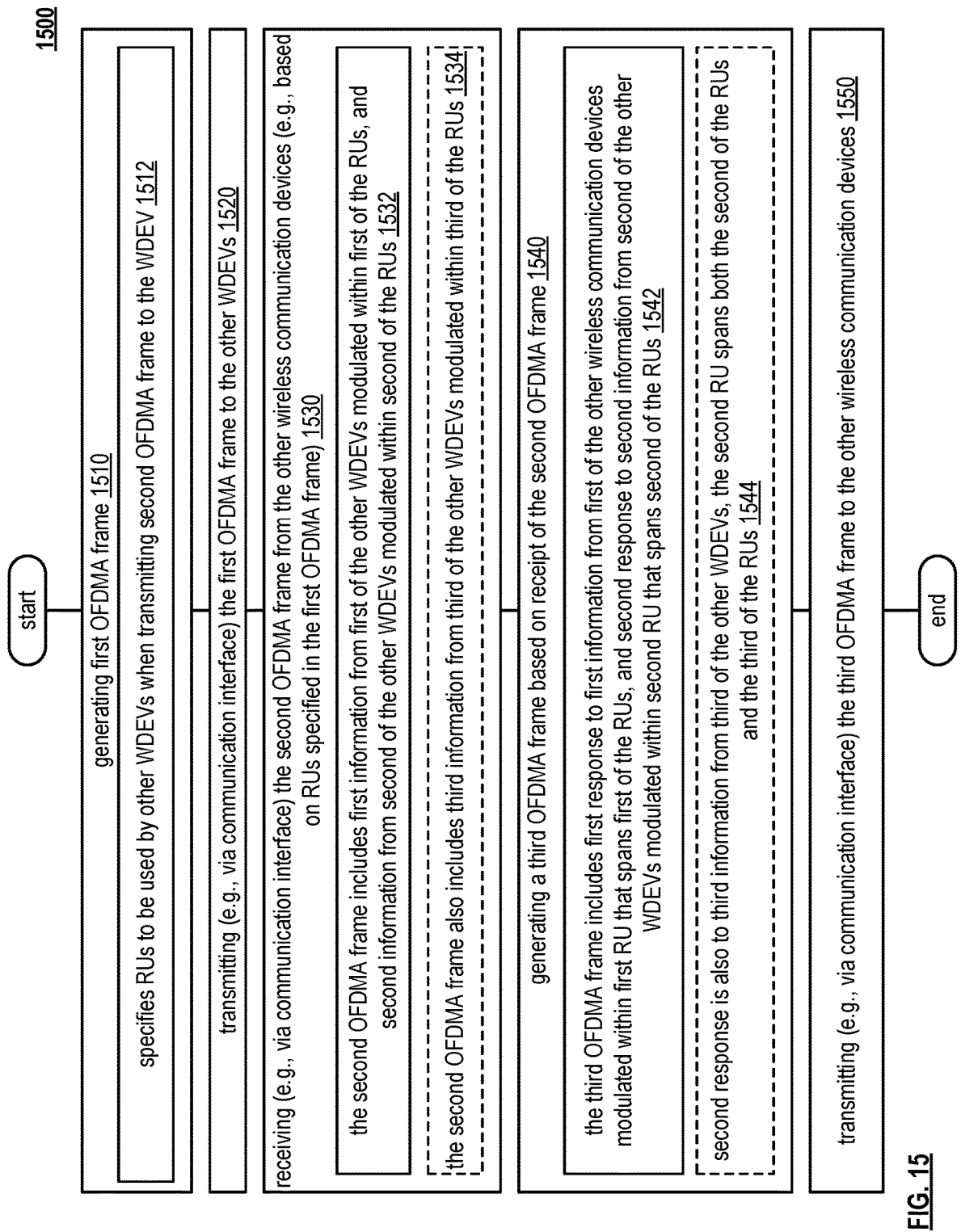
FIG. 15 is a diagram illustrating another embodiment of a method for execution by one or more wireless communication devices.

FIG. 15 is a diagram illustrating another embodiment of a method 1500 for execution by one or more wireless communication devices. The method 1500 continues in step 1510 by generating a first orthogonal frequency division multiple access (OFDMA) frame that specifies a plurality of resource units (RUs) to be used by a plurality of other wireless communication devices when transmitting a second OFDMA frame to the wireless communication device. The method 1500 continues in step 1520 by transmitting (e.g., via a communication interface of the wireless communication device) the first OFDMA frame to the plurality of other wireless communication devices;

The method 1500 continues in step 1530 by receiving (e.g., via the communication interface of the wireless communication device) the second OFDMA frame from the plurality of other wireless communication devices based on the plurality of RUs specified within the first OFDMA frame. In some examples, as shown in step 1532, the second OFDMA frame includes first information from a first of the plurality of other wireless communication devices modulated within a first of the plurality of RUs as specified in the first OFDMA frame and second information from a second of the plurality of other wireless communication devices modulated within a second of the plurality of RUs as specified in the first OFDMA frame. Also, in other examples, as shown in step 1534, the second OFDMA frame also includes third information from a third of the plurality of other wireless communication devices modulated within a third of the plurality of RUs as specified in the first OFDMA frame.

The method 1500 continues in step 1540 by generating, based on receipt of the second OFDMA frame, a third OFDMA frame. In some examples, as shown in step 1542, the third OFDMA frame includes a first response to the first information from the first of the plurality of other wireless communication devices modulated within a first RU that spans the first of the plurality of RUs and also includes a second response to the second information from the second of the plurality of other wireless communication devices modulated within a second RU that spans the second of the plurality of RUs. Also, in other examples, as shown in step 1544, the second response is also to the third information from the third of the plurality of other wireless communication devices, and the second RU spans both the second of the plurality of RUs and the third of the plurality of RUs.

The method 1500 continues in step 1550 by transmitting (e.g., via the communication interface of the wireless communication device) the third OFDMA frame to the plurality of other wireless communication devices.

It is noted that the various operations and functions described within various methods herein may be performed within a wireless communication device (e.g., such as by the processing circuitry 330, communication interface 320, and memory 340 and/or processing circuitry 330a and/or processing circuitry 330b such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   processing circuitry that is coupled to the communication interface, wherein at least one of the communication interface or the processing circuitry configured to:
      generate a first orthogonal frequency division multiple access (OFDMA) frame that specifies:
         a first plurality of resource units (RUs) to be used by a plurality of other wireless communication devices when transmitting a second OFDMA frame to the wireless communication device, and via bit indices in the first OFDMA frame, a second plurality of RUs within which the plurality of other wireless communication devices are to receive a third OFDMA frame from the wireless communication device, wherein the first plurality of RUs includes a first RU, a second RU and a third RU, and wherein
         a total number of sub-carriers in the second RU is greater than a total number of sub-carriers in the first RU; and
         a total number of sub-carriers in the third RU is greater than the total number of sub-carriers in the second RU;
      transmit the first OFDMA frame to the plurality of other wireless communication devices;
      receive the second OFDMA frame from the plurality of other wireless communication devices based on the first plurality of RUs specified within the first OFDMA frame, wherein the second OFDMA frame includes first information from a first wireless communication device of the plurality of other wireless communication devices modulated within a first RU of the first plurality of RUs as specified in the first OFDMA frame and second information from a second wireless communication device of the plurality of other wireless communication devices modulated within a second RU of the first plurality of RUs as specified in the first OFDMA frame;
      generate, based on receipt of the second OFDMA frame, and based on the second plurality of RUs specified within the first OFDMA frame, a third OFDMA frame; and
      transmit the third OFDMA frame to the plurality of other wireless communication devices.

2. The wireless communication device of claim 1 wherein:
   the first OFDMA frame includes a trigger frame;
   the second OFDMA frame includes an uplink (UL) multi-user (MU) PLCP Protocol Data Unit (PPDU), wherein PLCP corresponds to Physical Layer Convergence Procedure; and
   the third OFDMA frame includes a multi-block acknowledgement (M-BA) that includes:
      a first acknowledgement (ACK) that is based on receipt of the first information from the first of the plurality of other wireless communication devices, and
      a second ACK that is based on receipt of the second information from the second of the plurality of other wireless communication devices.

3. The wireless communication device of claim 1 wherein:
   the first OFDMA frame includes a trigger frame;
   the second OFDMA frame also includes third information from a third of the plurality of other wireless communication devices modulated within a third of the first plurality of RUs as specified in the first OFDMA frame; and
   the third OFDMA frame includes a multi-block acknowledgement (M-BA) that includes:
      a first acknowledgement (ACK) that is based on receipt of the first information from the first of the plurality of other wireless communication devices, and
      a second ACK that is based on receipt of both the second information from the second of the plurality of other wireless communication devices and the third information from the third of the plurality of other wireless communication devices, wherein the second ACK is modulated within the second RU that spans both the second of the second plurality of RUs and the third of the second plurality of RUs.

4. The wireless communication device of claim 1, wherein the first OFDMA frame comprises a first wireless station (STA) identifier (ID) of the first wireless communication device that is assigned to a first RU of the second plurality of RUs, followed by a second STA ID of the second wireless communication device that is assigned to a second RU of the second plurality of RUs.

5. The wireless communication device of claim 1, wherein the at least one of the communication interface or the processing circuitry is further configured to:
generate a fourth OFDMA frame that specifies another plurality of RUs to be used by the plurality of other wireless communication devices when transmitting a fifth OFDMA frame to the wireless communication device;
transmit the fourth OFDMA frame to the plurality of other wireless communication devices;
receive the fifth OFDMA frame from the plurality of other wireless communication devices based on the another plurality of RUs specified within the fourth OFDMA frame, wherein the fifth OFDMA frame includes third information from the first of the plurality of other wireless communication devices and fourth information from the second of the plurality of other wireless communication devices;
generate, based on receipt of the fifth OFDMA frame, a sixth OFDMA frame that includes a multi-block acknowledgement (M-BA) that includes:
a first signal field (SIG) for the first of the plurality of other wireless communication devices modulated within a first at least one RU that spans and specifies a first RU of the first plurality of RUs within which the first of the plurality of other wireless communication devices is to receive a first acknowledgement (ACK) from the wireless communication device that is based on receipt of the third information from the first of the plurality of other wireless communication devices, wherein the first ACK is subsequent to the first SIG within the sixth OFDMA frame; and
a second SIG for the second of the plurality of other wireless communication devices modulated within a second at least one RU that spans and specifies a second RU of the second plurality of RUs within which the second of the plurality of other wireless communication devices is to receive a second ACK from the wireless communication device that is based on receipt of the fourth information from the second of the plurality of other wireless communication devices, wherein the second ACK is subsequent to the second SIG within the sixth OFDMA frame.

6. The wireless communication device of claim 1, wherein the first OFDMA frame comprises a first wireless station (STA) identifier (ID) of the first wireless communication device that is assigned to a first RU of the first plurality of RUs, followed by a second STA ID of the second wireless communication device that is assigned to a second RU of the first plurality of RUs.

7. The wireless communication device of claim 1 further comprising:
the communication interface configured to support communications within at least one of a satellite communication system, a wireless communication system, a wired communication system, a fiber-optic communication system, or a mobile communication system; and
the processing circuitry configured to transmit at least one of the first OFDMA frame, receive the second OFDMA frame, or transmit the third OFDMA frame via the communication interface.

8. The wireless communication device of claim 1 further comprising:
an access point (AP), wherein at least one of the plurality of other wireless communication devices includes a wireless station (STA).

9. The wireless communication device of claim 1, wherein each of the second plurality of RUs is specified in a trigger-dependent per user information (info) field of a corresponding per user info field of the first OFDMA frame.

10. A wireless communication device comprising:
a communication interface; and
processing circuitry that is coupled to the communication interface, wherein at least one of the communication interface or the processing circuitry configured to:
generate a first orthogonal frequency division multiple access (OFDMA) frame that specifies:
a first plurality of resource units (RUs) to be used by a plurality of other wireless communication devices when transmitting a second OFDMA frame to the wireless communication device, and
via bit indices in the first OFDMA frame, a second plurality of RUs within which the plurality of other wireless communication devices are to receive a third OFDMA frame from the wireless communication device, wherein the first plurality of RUs includes a first RU, a second RU and a third RU, and wherein
a total number of sub-carriers in the second RU is greater than a total number of sub-carriers in the first RU, and
a total number of sub-carriers in the third RU is greater than the total number of sub-carriers in the second RU;
transmit the first OFDMA frame to the plurality of other wireless communication devices;
receive the second OFDMA frame from the plurality of other wireless communication devices based on the first plurality of RUs specified within the first OFDMA frame, wherein the second OFDMA frame includes first information from a first wireless communication device of the plurality of other wireless communication devices modulated within a first RU of the first plurality of RUs as specified in the first OFDMA frame, second information from a second wireless communication device of the plurality of other wireless communication devices modulated within a second RU of the first plurality of RUs as specified in the first OFDMA frame, and third information from a third wireless communication device of the plurality of other wireless communication devices modulated within a third RU of the first plurality of RUs as specified in the first OFDMA frame, wherein the second OFDMA frame includes an uplink (UL) multi-user (MU) PLCP Protocol Data Unit (PPDU), wherein PLCP corresponds to Physical Layer Convergence Procedure; and
generate, based on receipt of the second OFDMA frame, and based on the second plurality of RUs specified within the first OFDMA frame, a third OFDMA frame; and transmit the third OFDMA frame to the plurality of other wireless communication devices.

11. The wireless communication device of claim 10 wherein:
the first OFDMA frame includes a trigger frame; and
the third OFDMA frame includes a multi-block acknowledgement (M-BA) that includes:
a first acknowledgement (ACK) that is based on receipt of the first information from the first of the plurality of other wireless communication devices; and
a second ACK that is based on receipt of both the second information from the second of the plurality of other wireless communication devices and the third information from the third of the plurality of other wireless communication devices, wherein the second ACK is modulated within the second RU that spans both the second of the second plurality of RUs and the third of the second plurality of RUs.

12. The wireless communication device of claim 10, wherein the first OFDMA frame comprises a first wireless station (STA) identifier (ID) of the first wireless communication device that is assigned to a first RU of the second plurality of RUs, followed by a second STA ID of the second wireless communication device that is assigned to a second RU of the second plurality of RUs.

13. The wireless communication device of claim 10 further comprising:
the communication interface configured to support communications within at least one of a satellite communication system, a wireless communication system, a wired communication system, a fiber-optic communication system, or a mobile communication system; and
the processing circuitry configured to transmit at least one of the first OFDMA frame, receive the second OFDMA frame, or transmit the third OFDMA frame via the communication interface.

14. The wireless communication device of claim 10 further comprising:
an access point (AP), wherein at least one of the plurality of other wireless communication devices includes a wireless station (STA).

15. The wireless communication device of claim 10, wherein each of the second plurality of RUs is specified in a trigger-dependent per user information (info) field of a corresponding per user info field of the first OFDMA frame.

16. A method for execution by a wireless communication device, the method comprising:
generating a first orthogonal frequency division multiple access (OFDMA) frame that specifies:
a first plurality of resource units (RUs) to be used by a plurality of other wireless communication devices when transmitting a second OFDMA frame to the wireless communication device, and
via bit indices in the first OFDMA frame, a second plurality of RUs within which the plurality of other wireless communication devices are to receive a third OFDMA frame from the wireless communication device, wherein the first plurality of RUs includes a first RU, a second RU and a third RU, and wherein
a total number of sub-carriers in the second RU is greater than a total number of sub-carriers in the first RU, and
a total number of sub-carriers in the third RU is greater than the total number of sub-carriers in the second RU;

transmitting, via a communication interface of the wireless communication device, the first OFDMA frame to the plurality of other wireless communication devices;
receiving, via the communication interface of the wireless communication device, the second OFDMA frame from the plurality of other wireless communication devices based on the first plurality of RUs specified within the first OFDMA frame, wherein the second OFDMA frame includes first information from a first wireless communication device of the plurality of other wireless communication devices modulated within a first RU of the first plurality of RUs as specified in the first OFDMA frame and second information from a second wireless communication device of the plurality of other wireless communication devices modulated within a second RU of the first plurality of RUs as specified in the first OFDMA frame;
generating, based on receipt of the second OFDMA frame, and based on the second plurality of RUs specified within the first OFDMA frame, a third OFDMA frame; and
transmitting, via the communication interface of the wireless communication device, the third OFDMA frame to the plurality of other wireless communication devices.

17. The method of claim 16, wherein:
the first OFDMA frame includes a trigger frame;
the second OFDMA frame includes an uplink (UL) multi-user (MU) PLCP Protocol Data Unit (PPDU), wherein PLCP corresponds to Physical Layer Convergence Procedure; and
the third OFDMA frame includes a multi-block acknowledgement (M-BA) that includes:
a first acknowledgement (ACK) that is based on receipt of the first information from the first of the plurality of other wireless communication devices; and
a second ACK that is based on receipt of the second information from the second of the plurality of other wireless communication devices.

18. The method of claim 16, wherein:
the first OFDMA frame includes a trigger frame;
the second OFDMA frame also includes third information from a third of the plurality of other wireless communication devices modulated within a third of the first plurality of RUs as specified in the first OFDMA frame; and
the third OFDMA frame includes a multi-block acknowledgement (M-BA) that includes:
a first acknowledgement (ACK) that is based on receipt of the first information from the first of the plurality of other wireless communication devices; and
a second ACK that is based on receipt of both the second information from the second of the plurality of other wireless communication devices and the third information from the third of the plurality of other wireless communication devices, wherein the second ACK is modulated within the second RU that spans both the second of the second plurality of RUs and the third of the second plurality of RUs.

19. The method of claim 16, wherein the first OFDMA frame comprises a first wireless station (STA) identifier (ID) of the first wireless communication device that is assigned to a first RU of the second plurality of RUs, followed by a second STA ID of the second wireless communication device that is assigned to a second RU of the second plurality of RUs.

20. The method of claim 16 further comprising:
generating a fourth OFDMA frame that specifies another plurality of RUs to be used by the plurality of other wireless communication devices when transmitting a fifth OFDMA frame to the wireless communication device;
transmitting, via the communication interface of the wireless communication device, the fourth OFDMA frame to the plurality of other wireless communication devices;
receiving, via the communication interface of the wireless communication device, the fifth OFDMA frame from the plurality of other wireless communication devices based on the another plurality of RUs specified within the fourth OFDMA frame, wherein the fifth OFDMA frame includes third information from the first of the plurality of other wireless communication devices and fourth information from the second of the plurality of other wireless communication devices;
generating, based on receipt of the fifth OFDMA frame, a sixth OFDMA frame that includes a multi-block acknowledgement (M-BA) that includes:
a first signal field (SIG) for the first of the plurality of other wireless communication devices modulated within a first at least one RU that spans and specifies a first RU of the plurality of RUs within which the first of the plurality of other wireless communication devices is to receive a first acknowledgement (ACK) from the wireless communication device that is based on receipt of the third information from the first of the plurality of other wireless communication devices, wherein the first ACK is subsequent to the first SIG within the sixth OFDMA frame; and
a second SIG for the second of the plurality of other wireless communication devices modulated within a second at least one RU that spans and specifies a second RU of the plurality of RUs within which the second of the plurality of other wireless communication devices is to receive a second ACK from the wireless communication device that is based on receipt of the fourth information from the second of the plurality of other wireless communication devices, wherein the second ACK is subsequent to the second SIG within the sixth OFDMA frame.

21. The method of claim 16, wherein the first OFDMA frame comprises a first wireless station (STA) identifier (ID) of the first wireless communication device that is assigned to a first RU of the first plurality of RUs, followed by a second STA ID of the second wireless communication device that is assigned to a second RU of the first plurality of RUs.

22. The method of claim 16, wherein the wireless communication device includes an access point (AP), and wherein at least one of the plurality of other wireless communication devices includes a wireless station (STA).

23. The method of claim 16, wherein each of the second plurality of RUs is specified in a trigger-dependent per user information (info) field of a corresponding per user info field of the first OFDMA frame.

* * * * *